(12) United States Patent
Zhang et al.

(10) Patent No.: US 12,240,069 B2
(45) Date of Patent: Mar. 4, 2025

(54) MULTIFUNCTIONAL CLIMBING OPERATION PLATFORM AND OPERATION METHOD

(71) Applicants: STATE GRID ANHUI ELECTRIC POWER CO., LTD., Anhui (CN); State Grid Fuyang Electric Power Supply Company, Fuyang (CN)

(72) Inventors: Jinfeng Zhang, Anhui (CN); Jun Liu, Anhui (CN); Zhiyu Cheng, Anhui (CN); Lei Sun, Anhui (CN); Zhiwen Gong, Anhui (CN); Bingyu Sun, Anhui (CN); Tianzhong Zhang, Anhui (CN); Shenghe Wang, Anhui (CN); Yihua Luo, Anhui (CN); Jie Huang, Anhui (CN); Daping Liu, Anhui (CN); Yong Liu, Anhui (CN); Chengzhi Liu, Anhui (CN); Daojing Wang, Anhui (CN); Lanbo Yao, Anhui (CN); Xingyuan Guo, Anhui (CN)

(73) Assignees: STATE GRID ANHUI ELECTRIC POWER CO., LTD., Hefei (CN); State Grid Fuyang Electric Power Supply Company, Fuyang (CN)

( * ) Notice: Subject to any disclaimer, the term of this patent is extended or adjusted under 35 U.S.C. 154(b) by 285 days.

(21) Appl. No.: 18/064,944

(22) Filed: Dec. 13, 2022

(65) Prior Publication Data
US 2023/0114661 A1    Apr. 13, 2023

Related U.S. Application Data

(63) Continuation-in-part of application No. PCT/CN2022/077729, filed on Feb. 24, 2022.

(30) Foreign Application Priority Data

Jun. 21, 2021    (CN) .......................... 202110685935.8
Jun. 21, 2021    (CN) .......................... 202121383696.2

(51) Int. Cl.
*B23P 19/06*    (2006.01)
*B62D 57/024*    (2006.01)

(52) U.S. Cl.
CPC ............ *B23P 19/06* (2013.01); *B62D 57/024* (2013.01)

(58) Field of Classification Search
CPC .......... B23P 19/06; B62D 57/024; B25J 11/00
See application file for complete search history.

(56) References Cited

U.S. PATENT DOCUMENTS 11,504,854 B2 *   11/2022   Marvi ................... B25J 9/1694
12,042,699 B2 *   7/2024    Wu ........................ A63B 27/00

FOREIGN PATENT DOCUMENTS

CN    210478872 U  *  5/2020  ............. B62D 57/02
CN    112356940 A      2/2021
(Continued)

*Primary Examiner* — Jason L Vaughan

(57) ABSTRACT

The present disclosure provides a multifunctional climbing operation platform and an operation method thereof. The multifunctional climbing operation platform includes a main machine, clamping devices, a bolt retightening device, and an auxiliary sleeve replacement box, wherein the clamping devices each include: a fixed seat; and a pair of claw bars swingably arranged on the fixed seat and each including a rear bar body and a front bar body hinged together, wherein when the pair of claw bars are opened, an inner angle between the rear bar body and the front bar body is greater than 180°, the main machine and the clamping devices can climb along an object to be climbed, the bolt retightening device can replace different sleeves from the auxiliary sleeve replacement box, and can screw a bolt on the object. The present disclosure has the advantages of a large avoidance range and diverse functions.

21 Claims, 42 Drawing Sheets

(56) References Cited

FOREIGN PATENT DOCUMENTS

| CN | 112722101 A | 4/2021 |
| CN | 113500383 A | 10/2021 |
| CN | 113649796 A | 11/2021 |

\* cited by examiner

MULTIFUNCTIONAL CLIMBING OPERATION PLATFORM AND OPERATION METHOD

CROSS REFERENCE TO RELATED APPLICATIONS

The present application is a Continuation-In-Part Application of PCT Application No. PCT/CN2022/077729 filed on Feb. 24, 2022, which claims the benefit of Chinese Patent Application Nos. 202110685935.8 and 202121383696.2, both filed on Jun. 21, 2021. All the above are hereby incorporated by reference in their entirety.

TECHNICAL FIELD

The present disclosure relates to the field of climbing robots for electric power operations, and in particular to a multifunctional climbing operation platform and an operation method.

BACKGROUND

Angle steel towers are of importance in the electric power field. FIG. 41 and FIG. 42 each illustrate a schematic view of a main angle steel part a of an angle steel tower in the prior art. The main angle steel part a has a right-angled section and is provided with a plurality of foot nails a1 which are arranged on two outer surfaces of the main angle steel part from bottom to top. The foot nails a1 each are of a rod-like structure and are perpendicular to the respective outer surfaces of the main angle steel part a. Two adjacent main angle steel parts a are connected through a right-angled connecting plate a2. The connecting plate a2 is located outside a junction between the two main angle steel parts a and is fixedly connected to end portions of the main angle steel parts a through bolts. The electric angle steel towers are widely used and distributed, and are long exposed in field environments or even harsh environments with heavy dust, strong wind and high humidity. They are inspected and maintained with high danger coefficient, high labor intensity, long hang time, easy physical exhaustion of an operator and low efficiency, because the operator needs to work high above the ground to retighten connecting bolts. In view of the bolt retightening requirements, a number of inspection robots have been developed in the prior art for the electric angle steel towers or other high-altitude operations. For example, the Chinese Patent Publication No. CN 112356940 A discloses a climbing robot for an angle steel tower, which can climb an angle steel tower through clamping on an angle steel part by clamping jaws the, and avoid obstacles such as foot nails on the angle steel tower by opening the clamping jaws when climbing. However, due to a limited opening angle between the clamping jaws, the climbing robot cannot avoid long foot nails and has a small avoidance range. In actual climbing of the climbing robot on an angle steel tower, the clamping jaws are cooperated with a V-shaped portion, and the V-shaped portion is pressed against an edge of the angle steel part through a V-shaped groove, so as to clamp the angle steel tower firmly. As a matter of fact, adjacent angle steel parts are typically connected through a connecting plate. In other words, the connecting plate is protruded from an edge at a junction between two angle steel parts, which hinders traveling of the climbing robot. As the V-shaped portion in the prior art is fixed, and cannot avoid the angle steel connecting plate, the obstacles such as the angle steel connecting plate can only be avoided by adjusting postures of the climbing robot, which involves a more complicated structure and an inflexible action. Moreover, most climbing robots in the prior art do not have a bolt retightening function. Connecting bolts of the electric angle steel towers are still retightened manually, causing the high danger coefficient, high labor intensity, long hang time, easy physical exhaustion of an operator and low efficiency.

For example, the Chinese Patent Publication No. CN 112722101 A discloses a telescopic mechanism of a climbing robot for a body of a transmission tower, including a robot frame, as well as an intermediate mechanism and a clamping mechanism arranged at a same side as the robot frame. The clamping mechanism is connected to the robot frame through the intermediate mechanism which includes a push rod assembly. The robot frame includes a rail and a cross bar perpendicular to the rail. The push rod assembly pushes the cross bar to slide along the rail. A pushing force is applied to the cross bar through the push rod assembly of the intermediate mechanism for reverse extension and retraction, which effectively realizes individual climbing of the robot along an angle steel tower. The robot can fasten bolts on the body of the transmission tower with a carried fastening tool. In the prior art, the bolts are usually fastened with sleeves. However, in the telescopic mechanism of a climbing robot for a body of a transmission tower, the fastening tool cannot replace the sleeves adaptively according to different specifications of bolts to be fastened actually, but can only fasten bolts of one specification in single climbing, causing a small application range. When there is a need to fasten bolts of different specifications, the climbing robot is required to return back to the ground because of without sleeve replacement function. After a sleeve is replaced manually, the robot climbs again to a corresponding position for fastening. Consequently, the replacement efficiency is affected greatly, the operation is complicated, and the fastening efficiency is low.

SUMMARY

The present disclosure is intended to solve the following technical problems:

A climbing operation platform in the prior art has a small avoidance range and a simplex function.

The present disclosure solves the above-mentioned technical problems by the following technical solutions:

A multifunctional climbing operation platform includes a main machine, wherein the main machine is provided with a clamping device, a bolt retightening device, and an auxiliary sleeve replacement box, the clamping device comprises: a fixed seat; and a pair of claw bars arranged on the fixed seat and each comprising a rear bar body and a front bar body hinged together; when the two claw bars open, an inner angle between the rear bar body and the front bar body is greater than 180°, the main machine and the clamping device can climb along an object to be climbed, the bolt retightening device can replace different sleeves from the auxiliary sleeve replacement box, and the bolt retightening device can screw a bolt on the object to be climbed.

In actual applications, the multifunctional climbing operation platform provided by the present disclosure is mainly used in climbing on objects such as a main angle steel part. The multifunctional climbing operation platform climbs up along the main angle steel part through clamping the main angle steel part by the clamping device. The two claw bars of the clamping device get close to each other or away from each other to realize clamping or opening. The claw bars each include two segments. When the two claw bars are opened, the inner angle between the rear bar body and the front bar body is greater than 180°, and the opening angle of the clamping device is greater than that of the common clamping claws in the prior art. When the opened clamping device moves along the main angle steel part, obstacles such as long foot nails can be avoided due to the large opening angle, and thus an avoidance range is wider than that of the prior art. The bolt retightening device can screw a bolt on the object to be climbed, thereby implementing a bolt retightening function. When there is a need to retighten bolts of different specifications, the bolt retightening device only needs to replace different sleeves from the auxiliary sleeve replacement box. The multifunctional climbing operation platform can realize climbing, bolt retightening, sleeve replacement and so on at the same time, and meet different use requirements with a wide application range.

Preferably, at least two clamping devices are provided, and at least one of the clamping devices can slide back and forth relative to the main machine.

Preferably, two clamping devices are provided, and one clamping device can slide back and forth relative to the main machine, and the other clamping device can be fixed to the main machine.

Two clamping devices are provided, which can open and clamp alternately, achieving climbing along the main angle steel part, which yields simple structure and principle, and reliable actions.

Preferably, the clamping device which slides back and forth relative to the main machine is provided thereon with a slider, the main machine is provided with a sliding rail on which the slider is slidably mounted, and the main machine is further provided with a clamping device driving assembly.

In actual applications, the clamping device driving assembly can drive the clamping device to slide along the sliding rail to realize the climbing action, which yields a smooth movement.

Preferably, the clamping device driving assembly comprises a sliding screw rod and a motor for sliding arranged on the main machine, the clamping device which slides back and forth relative to the main machine is provided thereon with a sliding sleeve which is threadedly connected with the sliding screw rod, and the sliding screw rod is connected to an output shaft of the motor for sliding.

Preferably, the main machine is of a rectangular frame structure, and the clamping device driving assembly is located inside a frame of the main machine.

By locating the clamping device driving assembly inside the frame of the main machine, the overall structure is regular. Meanwhile, the main machine can protect the clamping device driving assembly inside from being affected by an outside object.

Preferably, the clamping device may further include a pressing member whose movable part is located between root portions of the two claw bars, and the movable part of the pressing member can slide away from or close to a clamping area between head portions of the two claw bars.

In response to clamping of the two claw bars, the movable part of the pressing member can slide close to the clamping area between the head portions of the two claw bars, such that the movable part of the pressing member abuts against an edge of the angle steel part to cooperate with the two claw bars for the clamping. In response to opening of the two claw bars, the movable part of the pressing member can slide away from the clamping area between the end portions of the two claw bars, such that the movable part of the pressing member is away from the edge of the angle steel part, and a certain safe distance can be kept between the movable part of the pressing member and the edge of the angle steel part. When the clamping device moves along a length direction of the angle steel part, the movable part of the pressing member can avoid the connecting plate protruded from the edge of the angle steel part.

Preferably, the movable part of the pressing member includes a V-shaped portion slidably mounted to the fixed seat, and the pressing member includes a V-shaped portion driving assembly arranged the fixed seat.

In actual applications, the V-shaped portion driving assembly can drive the V-shaped portion to press against the edge of the angle steel part. As a result, the V-shaped portion is closely attached to the edge of the angle steel part, and can be cooperated with the two claw bars for firm clamping. In addition, the V-shaped portion driving assembly can further drive the V-shaped portion to move away from the edge of the angle steel part to avoid the angle steel connecting plate. Therefore, the structure is simple, and the action is reliable.

Preferably, a pair of swing guide sleeves are hinged to the fixed seat, the rear bar body is slidably mounted in the respective swing guide sleeve, a push-pull plate is slidably provided on the fixed seat, which pulls the rear bar body such that a hinge position between the rear bar body and the front bar body is pulled in the respective swing guide sleeve to implement clamping of the pair of claw bars, and pushes the rear bar body such that the hinge position between the rear bar body and the front bar body is pushed out of the respective swing guide sleeve to implement opening of the pair of claw bars.

In actual applications, the push-pull plate is configured to provide a power source for the clamping and opening of the clamping device. In response to the clamping of the clamping device, the push-pull plate pulls the rear bar body such that the hinge position between the rear bar body and the front bar body is pulled into the respective swing guide sleeve. Meanwhile, the two swing guide sleeves swing such that the two claw bars get close to each other for the clamping. When the hinge position between the rear bar body and the front bar body is pulled into the respective swing guide sleeve, the rear bar body and the front bar body are confined in the respective swing guide sleeve, and the inner between the rear bar body and the front bar body is smaller, and may be, for example, 180°. Consequently, the confined rear bar body and front bar body cannot swing so as to implement the stable clamping. When the push-pull plate locates at different positions, positions of the two claw bars in the swing guide sleeves, as well as an included angle between the two swing guide sleeves, are different. In other words, a clamping angle between the two claw bars can be adjusted flexibly by adjusting the position of the push-pull plate. In response to the opening of the clamping device, the push-pull plate pushes the rear bar body such that the hinge position between the rear bar body and the front bar body is pushed out of the respective swing guide sleeve so as to implement the opening of the two claw bars. When the hinge position between the rear bar body and the front bar body is pushed out of the respective swing guide sleeve, the rear bar body and the front bar body swing. In this case, the inner angle between the rear bar body and the front bar body is greater than 180°. The obstacles such as the long foot nails can be avoided due to the large opening angle, and thus the avoidance range is wider than that of the prior art.

Preferably, the push-pull plate is provided with a pair of guiding grooves, the fixed seat is provided with a mounting plate which is provided with a pair of orientation grooves, an end portion of the rear bar body is provided with a plumbed push-pull shaft, and two ends of the plumbed push-pull shaft are slidably mounted in the respective guiding groove and the respective orientation groove, respectively.

With the guiding grooves and the orientation grooves, when the push-pull plate moves, the plumbed push-pull shafts can be guided to move along preset tracks. As a result, during reciprocation of the push-pull plate, the two rear bar bodies can be pulled at the same time to swing with the swing guide sleeves. The hinge positions between the rear bar bodies and the front bar bodies are pulled into the swing guide sleeves to realize the clamping of the two claw bars. Moreover, the two rear bar bodies can further be pushed at the same time to swing reversely with the swing guide sleeves. The hinge positions between the rear bar bodies and the front bar bodies are pushed out of the swing guide sleeves, and the inner angle between the rear bar bodies and the front bar bodies are greater than 180°, thereby realizing the opening of the two claw bars. With the guiding grooves and the orientation grooves, the clamping and opening actions can be reliable.

Preferably, the fixed seat is provided with a push-pull driving assembly which drives the push-pull plate to move back and forth, the push-pull driving assembly comprises a push-pull screw rod rotatably mounted to the fixed seat, which is rotatably mounted in the push-pull plate by means of threaded connection, the push-pull driving assembly further comprises a motor for pushing and pulling arranged on the fixed seat, which is connected to the push-pull screw rod through a second worm gear and worm assembly comprising a second worm gear and a second worm.

In actual applications, in response to rotation of the motor for pushing and pulling, a worm in the second worm gear and worm assembly can be driven to rotate, and a worm gear is driven to rotate. The worm gear drives the push-pull screw rod to rotate, and the push-pull screw rod drives the push-pull plate to move reciprocally. The second worm gear and worm assembly, as well as a screw rod nut assembly, can realize a large transmission ratio, which can provide a large push-pull driving force for the push-pull plate to implement the stable clamping and opening actions. Moreover, the second worm gear and worm assembly, and the screw rod nut assembly have a reverse locking function, that is, a power can only be transferred from the motor for pushing and pulling to the push-pull plate and cannot be transferred reversely, which can effectively ensure the stable clamping and opening and prevent defects such as infirm clamping or unsmooth opening.

Preferably, the swing guide sleeves each are provided with a limiting elastic piece, the front bar body is provided with a gap fitted with the limiting elastic piece, and when the hinge position between the rear bar body and the front bar body is pushed out of the respective swing guide sleeve, the limiting elastic piece is clamped into the gap so that the inner angle between the rear bar body and the front bar body is greater than 180°.

In actual applications, when the hinge positions between the rear bar bodies and the front bar bodies are pushed out of the swing guide sleeves, the gapes in the front bar bodies are exposed from the end portions of the swing guide sleeves. When the gapes move to the limiting elastic pieces, the limiting elastic pieces are clamped into the gapes. Under a force applied to the front bar bodies by the limiting elastic pieces when the limiting elastic pieces are clamped into the gapes, the front bar bodies swing outward around the hinge positions relative to the rear bar bodies, and can swing to positions at which the inner angles between the rear bar bodies and the front bar bodies are greater than 180°. Therefore, the avoidance range is expanded, the structure and principle are simple, and the action is sensitive and reliable. When the hinge positions between the rear bar bodies and the front bar bodies are retracted into the swing guide sleeves, the limiting elastic pieces slide out of the gapes to implement the clamping.

Preferably, the limiting elastic piece is located on an outer side of the respective swing guide sleeve, a first end of the limiting elastic piece is an inward bending end which is pressed on an outer side of the front bar body, and the gap is located on an outer side of an end of the front bar body hinged with the rear bar body.

In actual applications, the inward bending ends are used to be clamped into the gapes to adjust opening angles between the rear bar bodies and the front bar bodies, which yields a simple structure and reliable action.

Preferably, the swing guide sleeves each are provided with a fixed post on an outer side, the limiting elastic piece is provided with an elongated hole whose length direction is parallel to a guiding direction of the respective swing guide sleeve, the fixed post is located in the elongated hole, a second end of the limiting elastic piece is an outward bending connecting lug, and an axial tension spring is connected between the connecting lug and the fixed post.

The axial tension spring cans apply pulling forces to the ends where the connecting lugs are located such that the bending ends tend to press against the outer side of the front bar bodies, which ensures that the bending ends can slide in place accurately when the gapes slide out of the swing guide sleeves, and that the bending ends can slide flexibly out of the gapes when the gapes slide into the swing guide sleeves. Therefore, the overall structure and principle are simple, and the action is reliable.

Preferably, radial tension springs are provided between the limiting elastic piece and the respective swing guide sleeve, and the radial tension springs enable the limiting elastic piece to be pressed against the respective swing guide sleeve.

The limiting elastic pieces can be firmly pressed on the swing guide sleeves by means of the radial tension springs, which ensures that the limiting elastic pieces can slide in place accurately when the gapes slide out of the swing guide sleeves and that the limiting elastic pieces can slide flexibly out of the gapes when the gapes slide into the swing guide sleeves. Therefore, the overall structure and principle are simple, and the action is reliable.

Preferably, a reset tension spring is provided between the rear bar body and the front bar body, which enables the front bar body swing outward around an end portion of the rear bar body.

In actual applications, when the hinge positions between the rear bar bodies and the front bar bodies are pushed out of the swing guide sleeves, the front bar bodies swing outward around the hinge positions relative to the rear bar bodies under the action of pulling forces applied by the reset tension springs to the front bar bodies, and can swing to a position at which the inner angles between the rear bar bodies and the front bar bodies are greater than 180°. Therefore, the avoidance range is expanded, the structure and principle are simple, and the action is sensitive and reliable. When the hinge positions between the rear bar bodies and the front bar bodies are retracted into the swing guide sleeves, the reset tension springs are extended to implement the clamping.

Optionally, an opening angle between the two claw bars may be adjustable.

In actual applications, adjusting the opening angle between the two claw bars can implement clamping and climbing for different objects to be climbed, and thus the application range is wider.

Optionally, a pitching angle of the clamping device relative to the main machine may be adjustable.

In actual climbing, adjusting the pitching angle of the clamping device relative to the main machine can adjust a posture of the main machine. For example, the posture of the main machine can be adjusted to be parallel to the object to be climbed, and the like, thereby meeting actual climbing requirements.

The present disclosure further provides an operation method of the above multifunctional climbing operation platform, wherein two clamping devices are provided, one clamping device slides back and forth relative to the main machine, and the other clamping device is fixed to the main machine; and the operation method includes the following steps:

S1: allowing the slidable clamping device to clamp an object to be climbed, wherein two claw bars of the fixed clamping device are opened, and an inner angle between a rear bar body and a front bar body of each of the open claw bars is greater than 180°;

S2: allowing the main machine to move upward relative to the slidable clamping device along the object to be climbed;

S3: allowing, after the main machine stops to move upward, the fixed clamping device to clamp the object to be climbed, wherein two claw bars of the slidable clamping device are opened, and an inner between a rear bar body and a front bar body of each of the opened claw bars is greater than 180°;

S4: allowing the slidable clamping device to move upward along the main machine; and S5: repeating steps S1-S5 after the slidable clamping device stops to move upward; and when the main machine drives a bolt retightening device to climb to a position where a bolt is to be retightened, the two clamping devices clamp the object to be climbed, and the bolt retightening device screws the bolt on the object to be climbed, and when a sleeve is to be replaced, the bolt retightening device places the sleeve to be replaced into an auxiliary sleeve replacement box and replaces it with a new sleeve of the auxiliary sleeve replacement box.

In actual applications, the operation method provided by the present disclosure is simple in action, reliable in climbing, and smooth to implement climbing on objects such as an angle steel tower. In climbing, the inner angles between the rear bar bodies and the front bar bodies are greater than 180°, and the opening angles of the clamping devices are greater than that of the common clamping claws in the prior art. When the opened clamping device moves along the main angle steel part, obstacles such as long foot nails can be avoided due to the large opening angle, and thus an avoidance range is wider than that of the prior art. When the multifunctional climbing operation platform climbs to the position where a bolt is to be retightened, the two clamping devices clamp the object to be climbed so as to provide a stable support for a retightening operation. The bolt retightening device screws the bolt on the object to be climbed. Therefore, the climbing manner is simple and reliable, the stable support can be provided for the retightening operation, the retightening effect is desirable, and the operation efficiency is high. When there is a need to replace a sleeve, the bolt retightening device places the sleeve into the auxiliary sleeve replacement box, and replaces it with a new one of the auxiliary sleeve replacement box. Compared with the prior art, the bolt retightening device can replace sleeves of different specifications and retighten bolts of different specifications in single climbing. Therefore, the application range is wide, and it is unnecessary to return back to the ground for manual replacement, so that the operation is convenient, and the fastening efficiency is high.

Preferably, the clamping devices each further comprises a pressing member whose movable part is located between the root portions of the two claw bars, and the movable part of the pressing member slides away from or close to a clamping area between the end portions of the two claw bars;

when a clamping device clamps the object to be climbed, the movable part of the pressing member of the clamping device moves toward the object to be climbed, and is pressed against the object to be climbed; and when the two claw bars of a clamping device are opened, the movable part of the pressing member of the clamping device moves away from the object to be climbed.

Preferably, pitching angles of the clamping devices relative to the main machine are adjustable, and before one clamping device clamps the object to be climbed, a pitching angle of the clamping device relative to the main machine can be adjusted through the other clamping device, such that the main machine is parallel to the object to be climbed.

The present disclosure has the following advantages:

1. In actual applications, the multifunctional climbing operation platform provided by the present disclosure is mainly used in climbing on objects such as a main angle steel material. The multifunctional climbing operation platform climbs up along the main angle steel part through clamping the main angle steel part by the clamping device. The two claw bars of the clamping device get close to each other or away from each other to realize clamping or opening. The claw bars each include two segments. When the two claw bars are opened, the inner angle between the rear bar body and the front bar body is greater than 180°, and the opening angle of the clamping device is greater than that of the common clamping claws in the prior art. When the opened clamping device moves along the main angle steel part, obstacles such as long foot nails can be avoided due to the large opening angle, and thus an avoidance range is wider than that of the prior art. The bolt retightening device can screw a bolt on the object to be climbed, thereby implementing a bolt retightening function. When there is a need to retighten bolts of different specifications, the bolt retightening device only needs to replace different sleeves from the auxiliary sleeve replacement box. The multifunctional climbing operation platform can realize climbing, bolt retightening, sleeve replacement and so on at the same time, and meet different use requirements with a wide application range.

2. Two clamping devices are provided, which can open and clamp alternately, achieving climbing along the main angle steel part, which yields simple structure and principle, and reliable actions.

3. In actual applications, the clamping device driving assembly can drive the clamping device to slide along the sliding rail to realize the climbing action, which yields a smooth movement.

4. By locating the clamping device driving assembly inside the frame of the main machine, the overall structure is regular. Meanwhile, the main machine can protect the clamping device driving assembly inside from being affected by an outside object.

5. In response to clamping of the two claw bars, the movable part of the pressing member can slide close to the clamping area between the head portions of the two claw bars, such that the movable part of the pressing member abuts against an edge of the angle steel part to cooperate with the two claw bars for the clamping. In response to opening of the two claw bars, the movable part of the pressing member can slide away from the clamping area between the end portions of the two claw bars, such that the movable part of the pressing member is away from the edge of the angle steel part, and a certain safe distance can be kept between the movable part of the pressing member and the edge of the angle steel part. When the clamping device moves along a length direction of the angle steel part, the movable part of the pressing member can avoid the connecting plate protruded from the edge of the angle steel part.

6. In actual applications, the V-shaped portion driving assembly can drive the V-shaped portion to press against the edge of the angle steel part. As a result, the V-shaped portion is closely attached to the edge of the angle steel part, and can be cooperated with the two claw bars for firm clamping. In addition, the V-shaped portion driving assembly can further drive the V-shaped portion to move away from the edge of the angle steel part to avoid the angle steel connecting plate. Therefore, the structure is simple, and the action is reliable.

7. In actual applications, the push-pull plate is configured to provide a power source for the clamping and opening of the clamping device. In response to the clamping of the clamping device, the push-pull plate pulls the rear bar body such that the hinge position between the rear bar body and the front bar body is pulled into the respective swing guide sleeve. Meanwhile, the two swing guide sleeves swing such that the two claw bars get close to each other for the clamping. When the hinge position between the rear bar body and the front bar body is pulled into the respective swing guide sleeve, the rear bar body and the front bar body are confined in the respective swing guide sleeve, and the inner between the rear bar body and the front bar body is smaller, and may be, for example, 180°. Consequently, the confined rear bar body and front bar body cannot swing so as to implement the stable clamping. When the push-pull plate locates at different positions, positions of the two claw bars in the swing guide sleeves, as well as an included angle between the two swing guide sleeves, are different. In other words, a clamping angle between the two claw bars can be adjusted flexibly by adjusting the position of the push-pull plate. In response to the opening of the clamping device, the push-pull plate pushes the rear bar body such that the hinge position between the rear bar body and the front bar body is pushed out of the respective swing guide sleeve so as to implement the opening of the two claw bars. When the hinge position between the rear bar body and the front bar body is pushed out of the respective swing guide sleeve, the rear bar body and the front bar body swing. In this case, the inner angle between the rear bar body and the front bar body is greater than 180°. The obstacles such as the long foot nails can be avoided due to the large opening angle, and thus the avoidance range is wider than that of the prior art.

8. With the guiding grooves and the orientation grooves, when the push-pull plate moves, the plumbed push-pull shafts can be guided to move along preset tracks. As a result, during reciprocation of the push-pull plate, the two rear bar bodies can be pulled at the same time to swing with the swing guide sleeves. The hinge positions between the rear bar bodies and the front bar bodies are pulled into the swing guide sleeves to realize the clamping of the two claw bars. Moreover, the two rear bar bodies can further be pushed at the same time to swing reversely with the swing guide sleeves. The hinge positions between the rear bar bodies and the front bar bodies are pushed out of the swing guide sleeves, and the inner angle between the rear bar bodies and the front bar bodies are greater than 180°, thereby realizing the opening of the two claw bars. With the guiding grooves and the orientation grooves, the clamping and opening actions can be reliable.

9. In actual applications, in response to rotation of the motor for pushing and pulling, a worm in the second worm gear and worm assembly can be driven to rotate, and a worm gear is driven to rotate. The worm gear drives the push-pull screw rod to rotate, and the push-pull screw rod drives the push-pull plate to move reciprocally. The second worm gear and worm assembly, as well as a screw rod nut assembly, can realize a large transmission ratio, which can provide a large push-pull driving force for the push-pull plate to implement the stable clamping and opening actions. Moreover, the second worm gear and worm assembly, and the screw rod nut assembly have a reverse locking function, that is, a power can only be transferred from the motor for pushing and pulling to the push-pull plate and cannot be transferred reversely, which can effectively ensure the stable clamping and opening and prevent defects such as infirm clamping or unsmooth opening.

10. In actual applications, when the hinge positions between the rear bar bodies and the front bar bodies are pushed out of the swing guide sleeves, the gapes in the front bar bodies are exposed from the end portions of the swing guide sleeves. When the gapes move to the limiting elastic pieces, the limiting elastic pieces are clamped into the gapes. Under a force applied to the front bar bodies by the limiting elastic pieces when the limiting elastic pieces are clamped into the gaps, the front bar bodies swing outward around the hinge positions relative to the rear bar bodies, and can swing to positions at which the inner angles between the rear bar bodies and the front bar bodies are greater than 180°. Therefore, the avoidance range is expanded, the structure and principle are simple, and the action is sensitive and reliable. When the hinge positions between the rear bar bodies and the front bar bodies are retracted into the swing guide sleeves, the limiting elastic pieces slide out of the gapes to implement the clamping.

11. In actual applications, the inward bending ends are used to be clamped into the gapes to adjust opening angles between the rear bar bodies and the front bar bodies, which yields a simple structure and reliable action.

12. The axial tension spring cans apply pulling forces to the ends where the connecting lugs are located such that the bending ends tend to press against the outer side of the front bar bodies, which ensures that the bending ends can slide in place accurately when the gapes slide out of the swing guide sleeves, and that the bending ends can slide flexibly out of the gapes when the gapes slide into the swing guide sleeves. Therefore, the overall structure and principle are simple, and the action is reliable.

13. The limiting elastic pieces can be firmly pressed on the swing guide sleeves by means of the radial tension springs, which ensures that the limiting elastic pieces can slide in place accurately when the gapes slide out of the swing guide sleeves and that the limiting elastic pieces can slide flexibly out of the gapes when the gapes slide into the swing guide sleeves. Therefore, the overall structure and principle are simple, and the action is reliable.

14. In actual applications, when the hinge positions between the rear bar bodies and the front bar bodies are pushed out of the swing guide sleeves, the front bar bodies swing outward around the hinge positions relative to the rear bar bodies under an action of pulling forces applied by the reset tension springs to the front bar bodies, and can swing to a position at which the inner angles between the rear bar bodies and the front bar bodies are greater than 180°. Therefore, the avoidance range is expanded, the structure and principle are simple, and the action is sensitive and reliable. When the hinge positions between the rear bar bodies and the front bar bodies are retracted into the swing guide sleeves, the reset tension springs are extended to implement the clamping.

15. In actual applications, adjusting the opening angle between the claw bars can implement clamping and climbing for different objects to be climbed, and thus the application range is wider.

16. In actual climbing, adjusting the pitching angle of the clamping device relative to the main machine can adjust a posture of the main machine. For example, the posture of the main machine can be adjusted to be parallel to the object to be climbed, and the like, thereby meeting actual climbing requirements.

17. In actual applications, the operation method provided by the present disclosure is simple in action, reliable in climbing, and smooth to implement climbing on objects such as a angle steel tower. In climbing, the inner angles between the rear bar bodies and the front bar bodies are greater than 180°, and the opening angles of the clamping devices are greater than that of the common clamping claws in the prior art. When the opened clamping device moves along the main angle steel part, obstacles such as long foot nails can be avoided due to the large opening angle, and thus an avoidance range is wider than that of the prior art. When the multifunctional climbing operation platform climbs to the position where a bolt is to be retightened, the two clamping devices clamp the object to be climbed so as to provide a stable support for a retightening operation. The bolt retightening device screws the bolt on the object to be climbed. Therefore, the climbing manner is simple and reliable, the stable support can be provided for the retightening operation, the retightening effect is desirable, and the operation efficiency is high. When there is a need to replace a sleeve, the bolt retightening device places the sleeve into the auxiliary sleeve replacement box, and replaces it with a new one of the auxiliary sleeve replacement box. Compared with the prior art, the bolt retightening device can replace sleeves of different specifications and retighten bolts of different specifications in single climbing. Therefore, the application range is wide, and it is unnecessary to return back to the ground for manual replacement, so that the operation is convenient, and the fastening efficiency is high.

Figure 1:
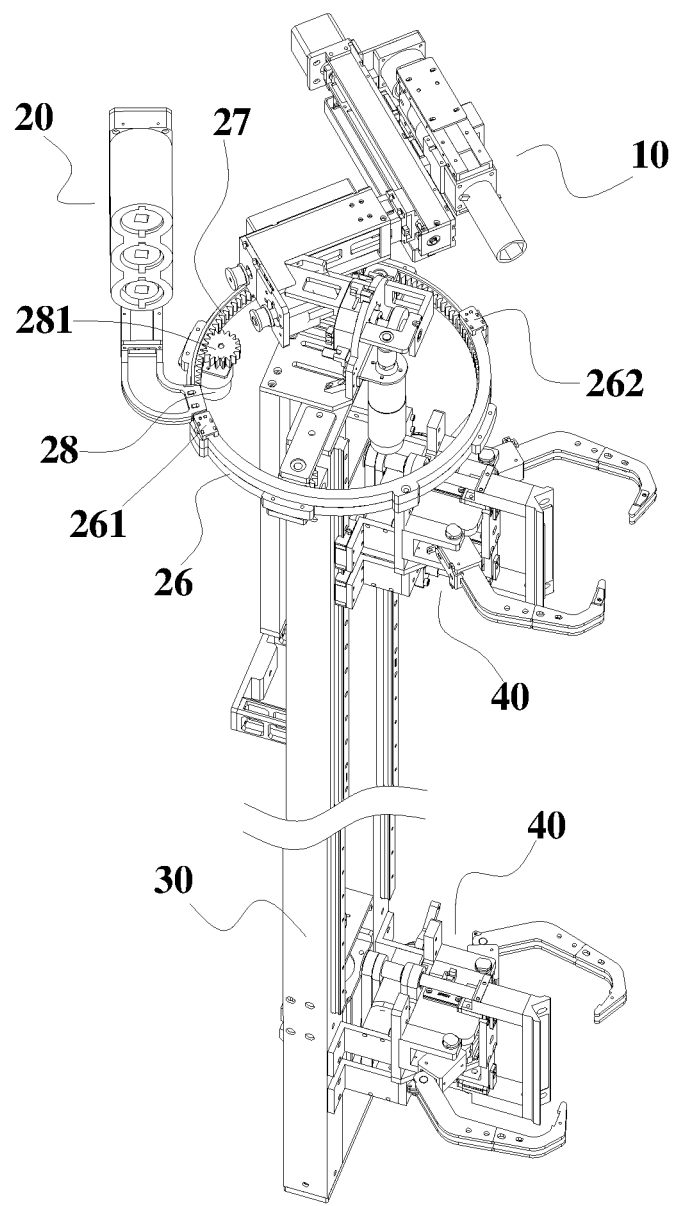
FIGS. 1-2 each are a perspective view of a multifunctional climbing operation platform according to Embodiment 1 of the present disclosure (with an auxiliary sleeve replacement box located at a standby position)

a—main angle steel part, a1—foot nail, a2—connecting plate, b—sleeve, b1—positioning notch, b2—detaching hole, and b3—locating bump;

10—bolt retightening device, 11—extension arm, 111—bottom frame, 111a—support rod, 111b—lower connecting transverse plate, 111c—clamping member, 111d—upper connecting transverse plate, 111e—right-angled member, 112—rotation assembly, 112a—rotating seat, 112b—rotating motor, 112c—turntable, 112d—rotating shaft, 112e—first worm gear, 112f—first worm, 112g—bracket, 113—X-axis displacement assembly, 113a—X-axis frame, 113b—X-axis movable member, 113c—X-axis screw rod, 113d—first endless belt, 114—Y-axis displacement assembly, 114a—Y-axis frame, 114b—Y-axis movable member, 114c—Y-axis screw rod, 115a—first motor, 115b—second motor, 116—fourth motor, 117—belt transmission assembly, 117a—second belt pulley, and 117b—second endless belt;

12—working head, 12a—striking seat, 12b—striking anchor rod, 12c—elastic pin, 12d—motor for striking, 12e—camera, 12f—rotating shaft sleeve, 12g—striking lug, 12h—striking head, and 12i—striking bump;

20—auxiliary sleeve replacement box, 21—box body, 211—accommodating hole, 21a—housing, 21b—mounting substrate, 212—notch, 213—retaining groove, 22—unlocking pull rod, 22a—arc avoidance groove, 22b—induction point, 23—power source, 24—connecting member, 25—photoelectric switch, 26—toothed ring guiding member, 261—first travel switch, 262—second travel switch, 263—support ring, 264—lower guiding groove, 265—arc member, 266—upper guiding groove, 27—toothed ring, 271—guiding gear, 28—fifth motor, 281—gear, 29—replacement box bracket, 291—L-shaped plate-like structure, and 292—hollowed-out bracket;

30—main machine, 31—sliding rail, 32—slider, 33—sliding screw rod, 34—sliding sleeve, and 35—motor for sliding;

40—clamping device, 41—fixed seat, 411—bottom plate, 412—vertical plate, 413—mounting frame, 414—front mounting seat, 415—rear mounting seat, 416—connecting plate, 417—reinforcing plate, 42—pressing member, 421—V-shaped portion, 422—threaded insert, 423—threaded rod, 424—third endless belt, 425—third motor, 43—clamping member, 431—claw bar, 431a—plumbed push-pull shaft, 431b—rear bar body, 431c—front bar body, 431d—plumbed shaft, 431e—intermediate claw part, 431f—gap, 431g—claw head, 431h—clamping claw connecting member, 432—swing guide sleeve, 432a—cooperated wall, 432b—fixed post, 433—plumbed hinge seat, 434—mounting plate, 434a—orientation groove, 434b—bending segment, 434c—linear segment, 434d—oblique segment, 435—push-pull plate, 435a—guiding groove, 436—limiting elastic piece, 436a—horizontal plate segment, 436b—connecting lug, 436c—bending end, 436d—elongated hole, 437a—reset tension spring, 437b—radial tension spring, 437c—axial tension spring, 438a—push-pull screw rod, 438b—motor for pushing and pulling, 438c—second worm gear, 438d—second worm, 44—pitching adjustment plate, 45—sliding plate, 46—pitching adjustment nut, 47—motor for adjusting pitching, and 48—pitching adjustment screw rod.

DETAILED DESCRIPTION

In order to make the objectives, technical solutions, and advantages of embodiments of the present disclosure clearer, the following clearly and completely describes the technical solutions in the embodiments of the present disclosure with reference to the examples of the present disclosure. Apparently, the described embodiments are some rather than all of the embodiments. All other embodiments obtained by those of ordinary skill in the art based on the embodiments of the present disclosure without creative efforts shall fall within the protection scope of the present disclosure. All other embodiments obtained by those of ordinary skill in the art based on the embodiments of the present disclosure without creative efforts shall fall within the protection scope of the present disclosure.

Embodiment 1

Figure 2:
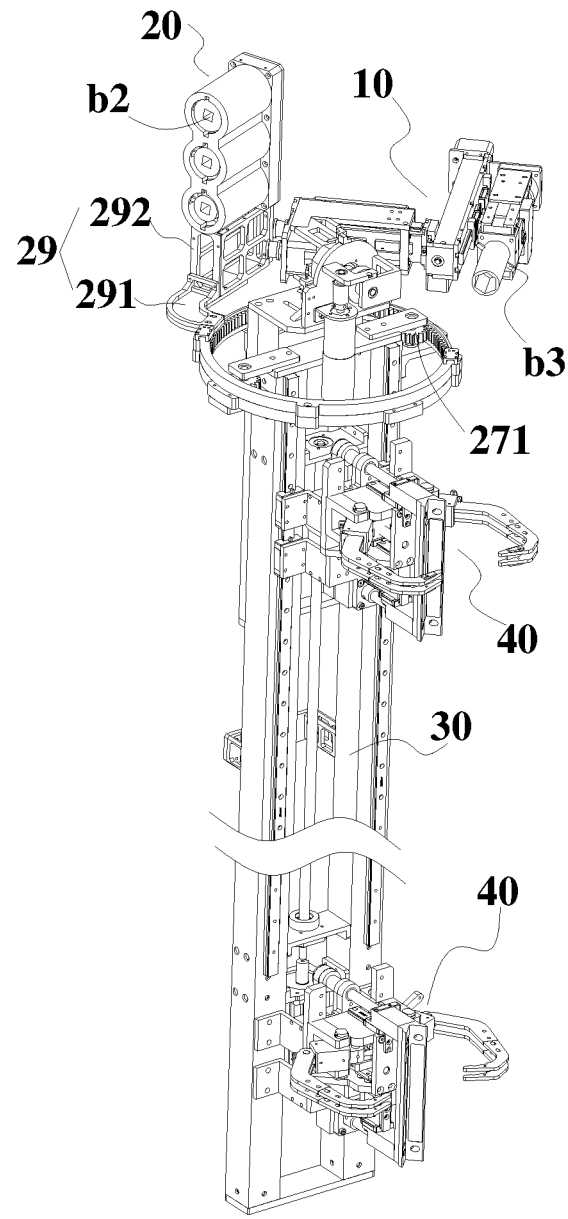
Figure 3:
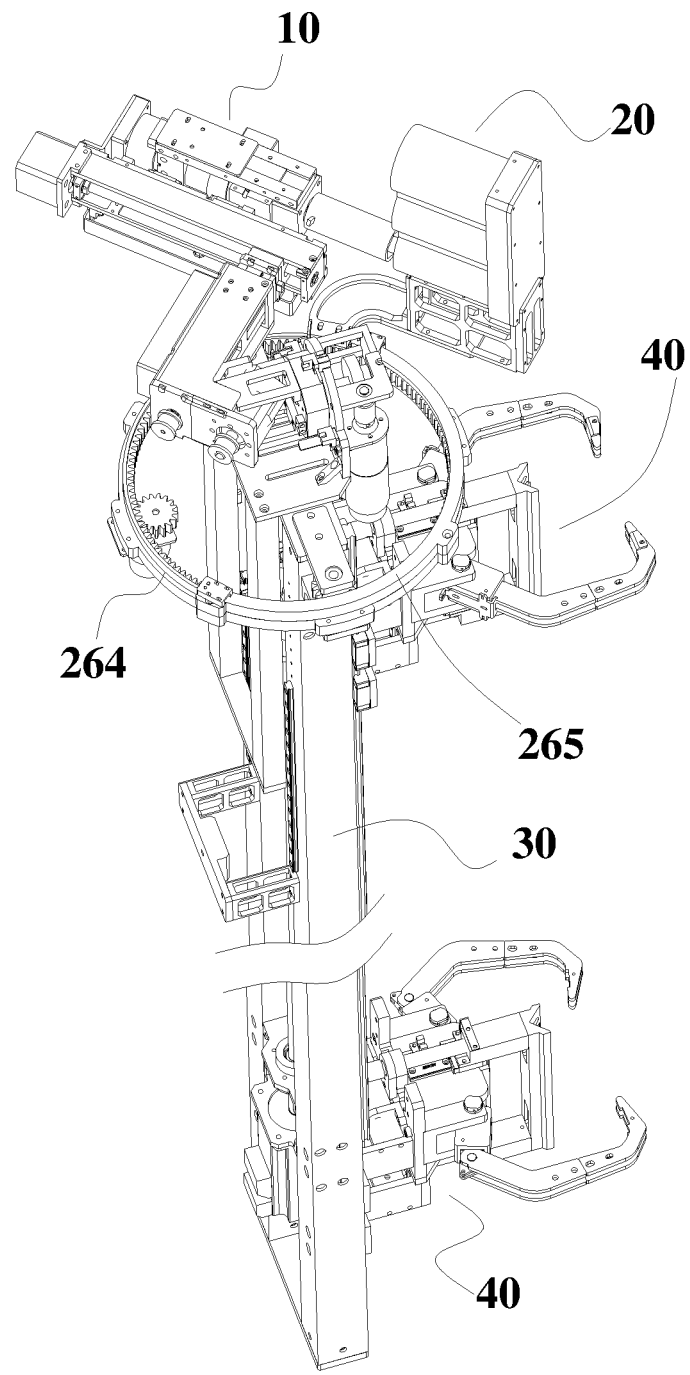
FIG. 3 is a perspective view of a multifunctional climbing operation platform according to Embodiment 1 of the present disclosure (with an auxiliary sleeve replacement box located at a replacement position)

As shown in FIGS. 1-3, a multifunctional climbing operation platform includes a main machine 30, clamping devices 40, a clamping device driving assembly, a bolt retightening device 10, and an auxiliary sleeve replacement box 20.

Figure 4:
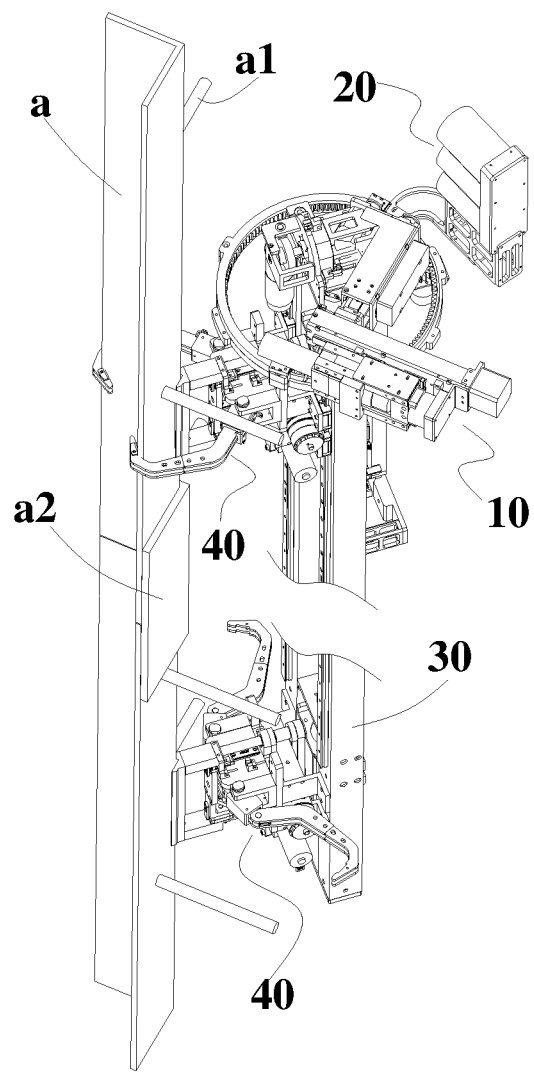
FIG. 4 is a schematic diagram showing climbing of a multifunctional climbing operation platform according to Embodiment 1 of the present disclosure.
Figure 5:
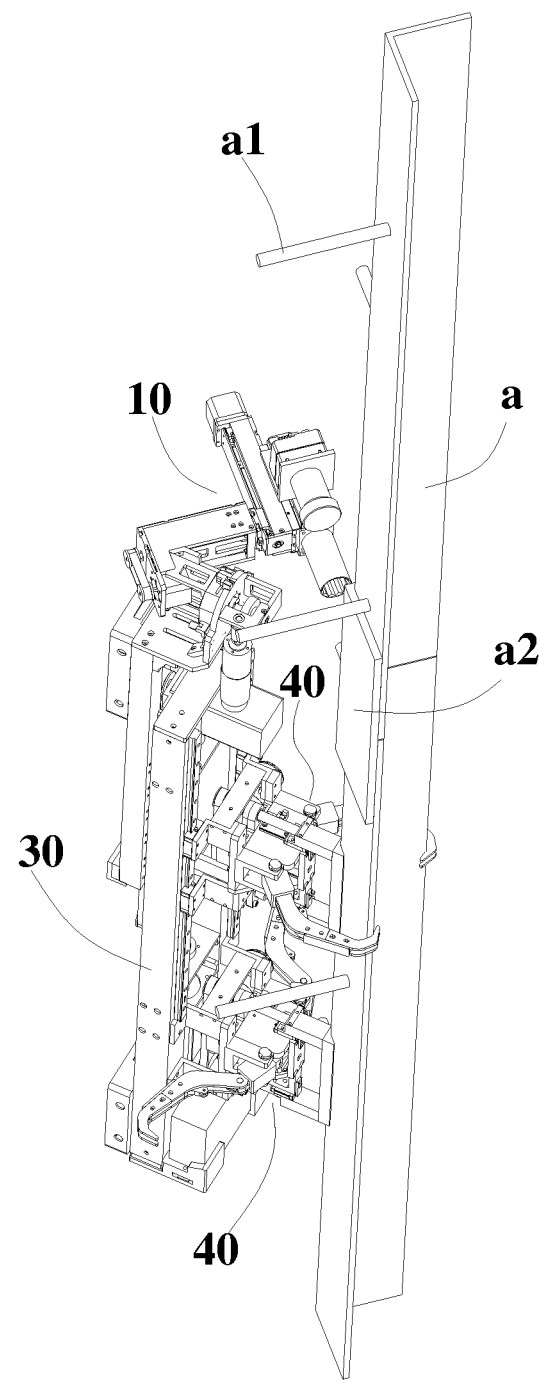
FIG. 5 is a schematic diagram showing climbing of a multifunctional climbing operation platform according to Embodiment 1 of the present disclosure (with an auxiliary sleeve replacement box not shown)

As shown in FIG. 4 and FIG. 5, the clamping devices 40 are arranged on the main machine 30 in the embodiment. For ease of understanding and description, a side where a main angle steel part a is located relative to the main machine 30 refers to a front side, that is, the clamping devices 40 are arranged at a front side of the main machine 30, upon which other orientations are reasoned. It is to be understood that the orientations are merely for convenience of description and understanding, rather than a limit to the present disclosure.

As shown in FIG. 1 and FIG. 2, the main machine 30 is provided with the bolt retightening device 10. The main machine 30 and the clamping devices 40 can climb along an object to be climbed. The bolt retightening device 10 can screw a bolt on the object to be climbed.

Figure 8:
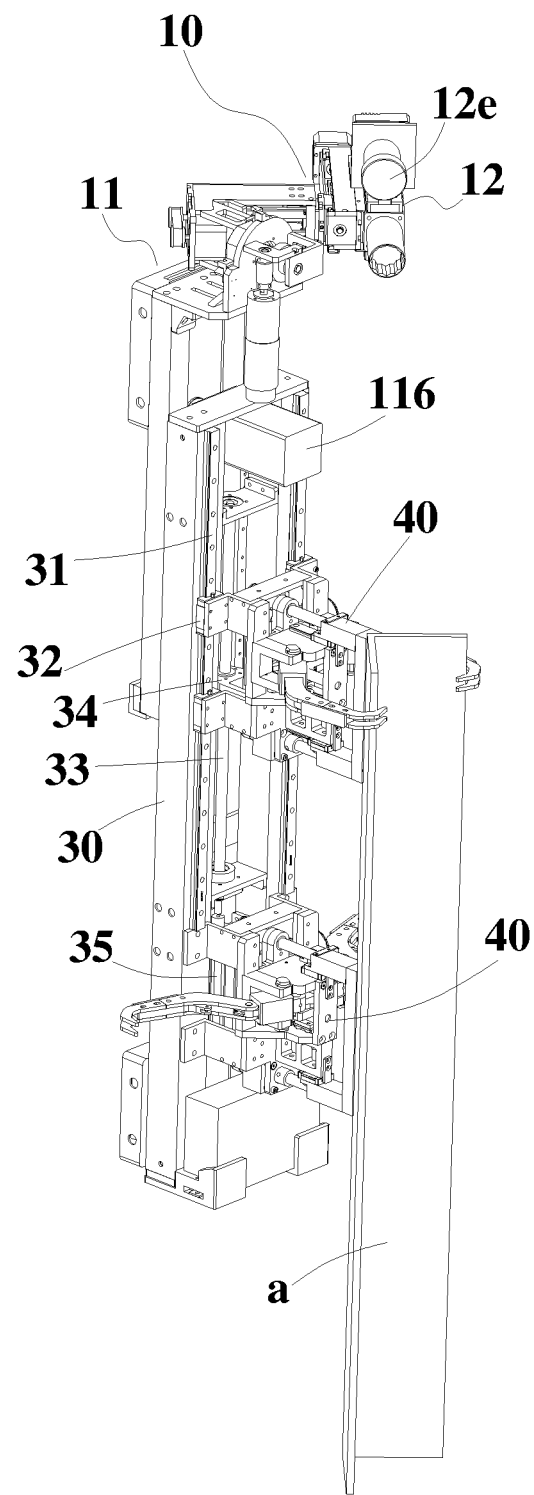
FIGS. 8-9 each are a perspective view of a multifunctional climbing operation platform according to Embodiment 1 of the present disclosure (with an auxiliary sleeve replacement box not shown)
Figure 9:
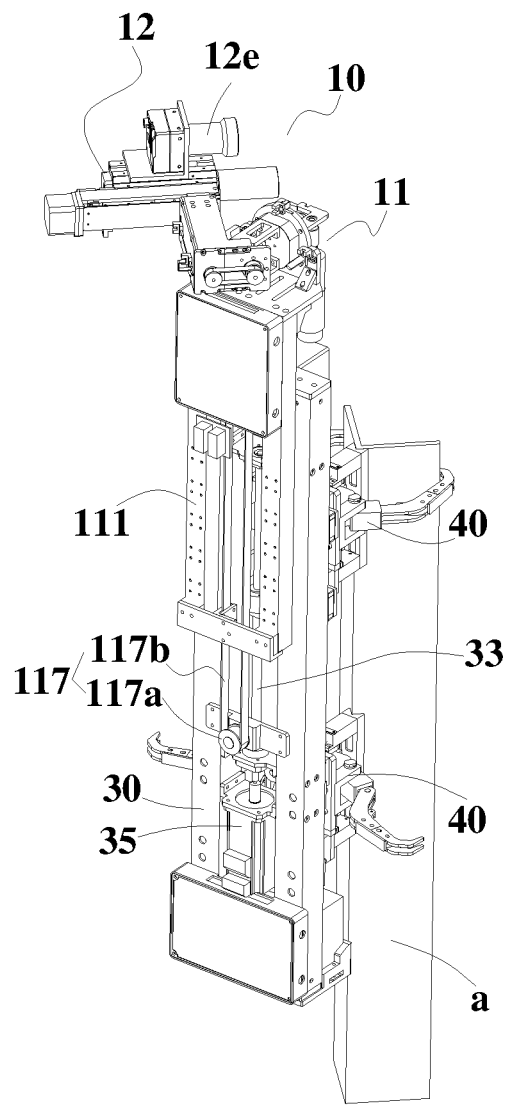

Specifically, as shown in FIG. 8 and FIG. 9, the bolt retightening device 10 includes an extension arm 11 arranged on the main machine 30. An end portion of the extension arm 11 is provided with a working head 12. A movable end of the working head 12 is provided with a sleeve b.

Figure 10:
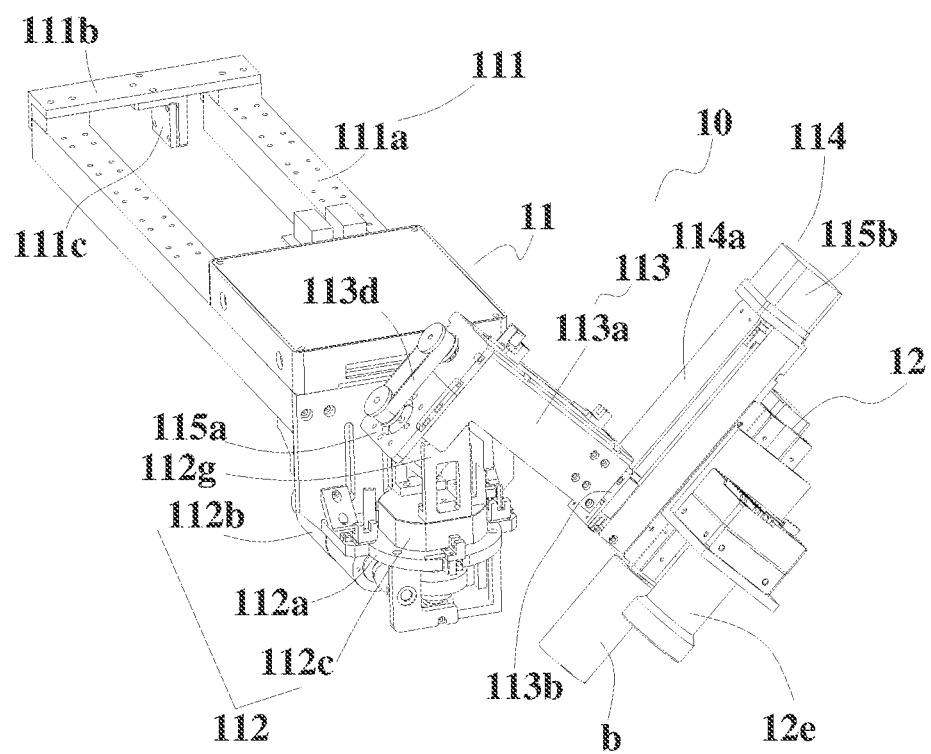
FIGS. 10-11 each are a perspective view of a bolt retightening device according to Embodiment 1 of the present disclosure.

Further, as shown in FIG. 9 and FIG. 10, the extension arm 11 includes a bottom frame 111 arranged on the main machine 30. An end portion of the bottom frame 111 is provided with a rotation assembly 112. Specifically, the bottom frame 111 includes two vertical support rods 111a. Lower ends of the two support rods 111a are connected through a lower connecting transverse plate 111b. A front side of the lower connecting transverse plate 111b is provided with a pair of clamping members 111c connected together through bolts. The clamping members 111c are configured to clamp and fix a second endless belt 117b.

Figure 11:
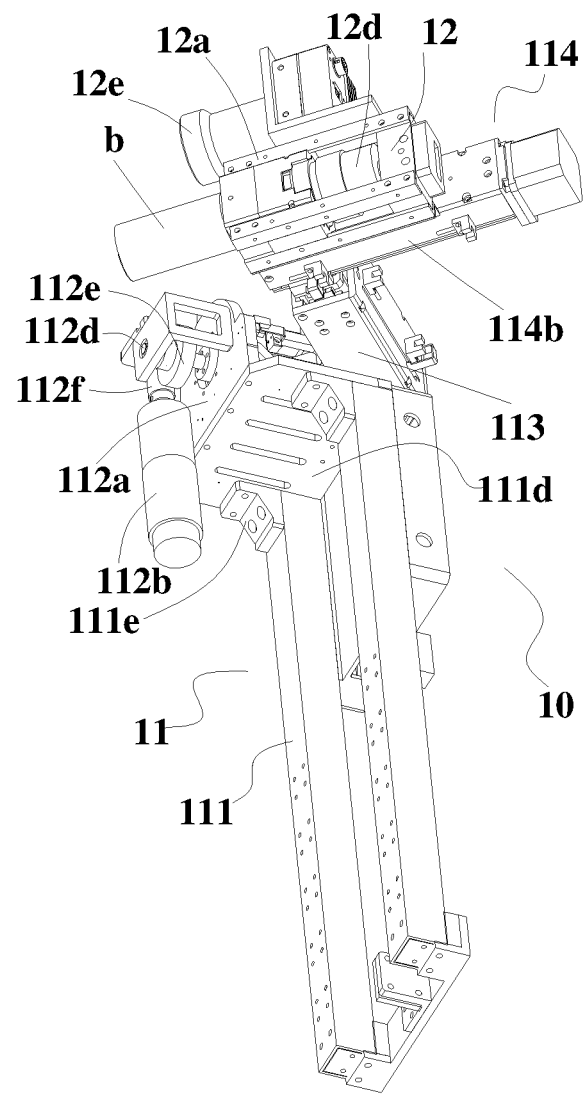

As shown in FIG. 10 and FIG. 11, upper ends of the two support rods 111a are connected through an upper connecting transverse plate 111d. The upper connecting transverse plate 111d is perpendicular to the two support rods 111a and is connected to the support rods 111a through right-angled members 111e. The right-angled members 111e are connected to a bottom surface of the upper connecting transverse plate 111d and top front sides of the support rods 111a through bolts.

As shown in FIG. 8 and FIG. 9, the bottom frame 111 is slidably mounted to the main machine 30. A sliding direction of the bottom frame 111 is parallel to a climbing direction of the main machine 30. Specifically, the main machine 30 is provided at a rear side with a pair of vertical guide rails. A slider is arranged on the bottom frame 111, which is specifically arranged at a front side of the support rods 111a. The slider is slidably mounted on the guide rail. As shown in FIG. 8 and FIG. 9, the main machine 30 is provided at an upper inner side with a fourth motor 116. An output shaft of the fourth motor 116 horizontally faces toward the rear side of the main machine and is provided with a first belt pulley. The fourth motor 116 drives the bottom frame 111 through a belt transmission assembly 117 to slide back and forth. Specifically, the belt transmission assembly 117 includes a second belt pulley 117a arranged at a lower rear side of the main machine 30. A second endless belt 117b is wound on the second belt pulley 117a and a first belt pulley of the fourth motor 116. The second endless belt 117b can reciprocate along a vertical direction. The clamping members 111c are fixedly connected to the second endless belt 117b.

Refer to FIG. 8 and FIG. 10, a rotation axis of the rotation assembly 112 is perpendicular to the object to be climbed. In the embodiment, the rotation axis of the rotation assembly 112 is perpendicular to the main angle steel part a, and points to a middle edge of the main angle steel part a. A movable end of the rotation assembly 112 is provided with an X-axis displacement assembly 113. A movable end of the X-axis displacement assembly 113 is provided with a Y-axis displacement assembly 114. A reciprocating direction of a movable end of the Y-axis displacement assembly 114 is perpendicular to a reciprocating direction of the movable end of the X-axis displacement assembly 113. The working head 12 is provided at the movable end of the Y-axis displacement assembly 114. As the main angle steel part a is right-angled, an included angle of 45° is formed between the reciprocating direction of the movable end of the X-axis displacement assembly 113 and the rotation axis of the rotation assembly 112, which ensures that when the working head 12 swings to a horizontal plane, its axis is perpendicular to a side of the main angle steel part a. The rotation axis of the rotation assembly 112, a reciprocating track of the movable end of the X-axis displacement assembly 113, and a reciprocating track of the movable end of the Y-axis displacement assembly 114 are all located in a same plane.

As shown in FIG. 10 and FIG. 11, the rotation assembly 112 includes a rotating seat 112a on the end portion of the bottom frame 111. Specifically, the rotating seat 112a is of a vertical plate-like structure, and perpendicular to the rotation axis of the rotation assembly 112. The rotating seat 112a is provided at a front end of the upper connecting transverse plate 111d through bolts. A reinforcing plate is provided between the rotating seat 112a and the upper connecting transverse plate 111d through bolts.

Figure 14:
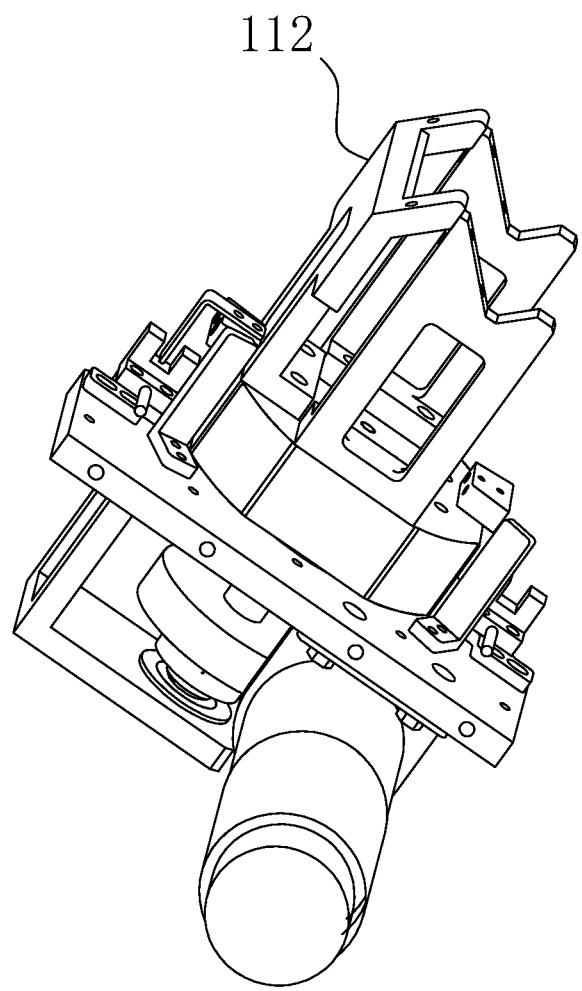
FIG. 14 is a perspective view of a rotation assembly according to Embodiment 1 of the present disclosure.
Figure 15:
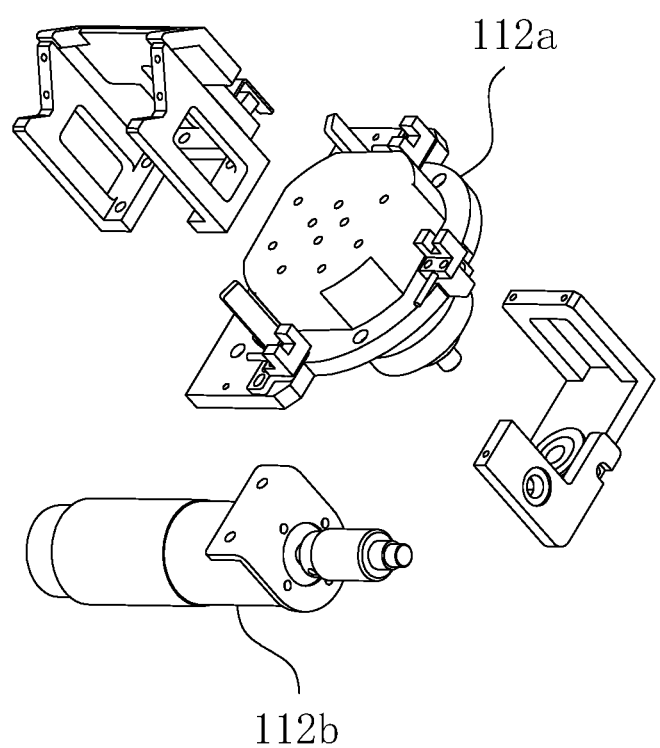
FIG. 15 is an exploded view of the assembly in FIG. 14.
Figure 16:
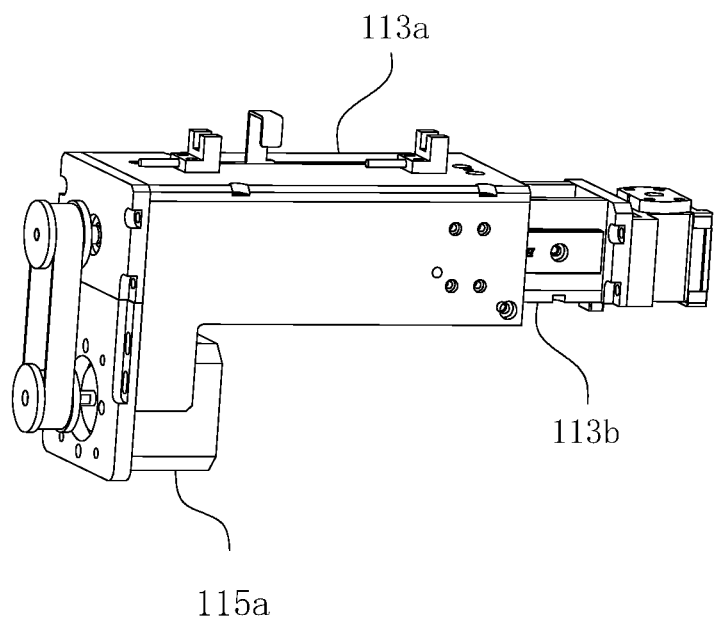
FIG. 16 is a perspective view of an X-axis displacement assembly according to Embodiment 1 of the present disclosure.

Refer to FIG. 10, FIG. 14 and FIG. 15, the rotating seat 112a is rotatably provided with a turntable 112c which is located at a rear side of the rotating seat 112a. A front side of the turntable 112c is provided with a rotating shaft 112d which is rotatably arranged in the rotating seat 112a through a bearing. A front end of the rotating shaft 112d is provided with a worm gear 112e. The rotation assembly further includes a rotating motor 112b at a front side of the rotating seat 112a. An output shaft of the rotating motor 112b is provided with a first worm 112f which is engaged with the first worm gear 112e, that is, the rotating motor 112b drives, through a first worm gear and worm assembly including the first worm 112f and the first worm gear 112e, the turntable 112c to rotate. A rear side of the turntable 112c is provided with a bracket 112g. The X-axis displacement assembly 113 is arranged on the bracket 112g of the turntable 112c.

Further, three photoelectric switches are arranged on the rotating seat 112a, which are respectively located right on the rotating shaft 112d as well as at left and right sides of the rotating shaft, and uniformly arranged on a rotating track of the turntable 112c. A right side of the turntable 112c is provided with baffles cooperated with the photoelectric switches.

Specifically, refer to FIG. 10, FIG. 12, FIG. 16 and FIG. 17, the X-axis displacement assembly 113 includes an X-axis frame 113a arranged at the movable end of the rotation assembly 112. Specifically, the X-axis frame 113a includes upper and lower L-shaped plates that are symmetrical to each other, and fixed to the bracket 112g. The X-axis frame 113a is provided with an X-axis movable member 113b, and rotatably provided with an X-axis screw rod 113c. An included angle of 45° is formed between the X-axis screw rod 113c and the rotating shaft 112d. Further, the two L-shaped plates of the X-axis frame 113a each are provided with a slider inside. Two sides of the X-axis movable member 113b each are provided with a sliding rail which is in sliding fit with the slider. The X-axis movable member 113b is of a rectangular frame structure, with a rear end provided with a nut cooperated with the X-axis screw rod 113c, that is, the X-axis movable member 113b is threadedly connected to the X-axis screw rod 113c through the nut. Two photoelectric switches are arranged on the X-axis frame 113a. Baffles cooperated with the photoelectric switches are arranged on the X-axis movable member 113b. The two photoelectric switches are configured to limit extreme positions in a travel of the X-axis movable member 113b.

Figure 12:
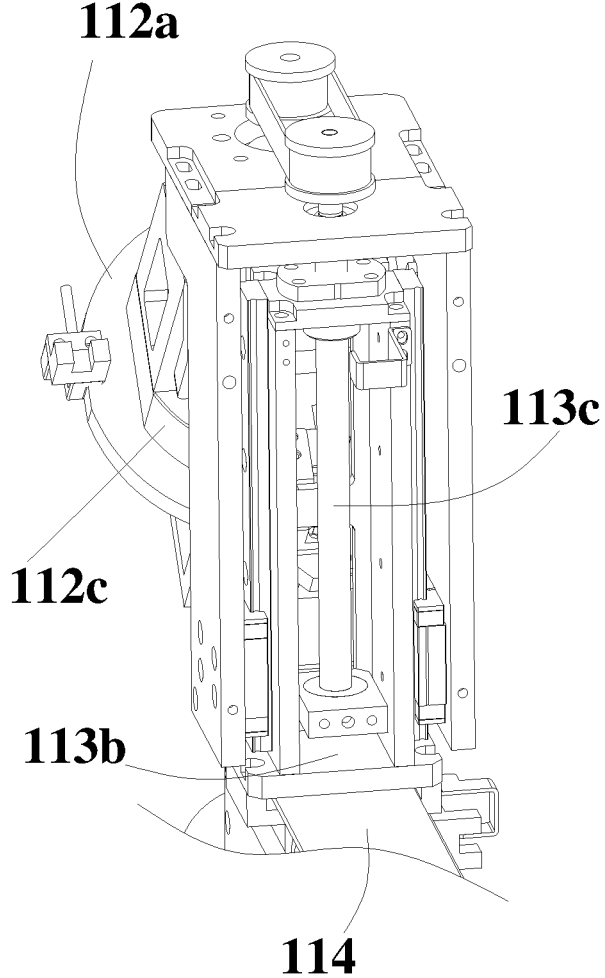
FIG. 12 is a perspective view of an X-axis displacement assembly according to Embodiment 1 of the present disclosure (with a part of components not shown)
Figure 13:
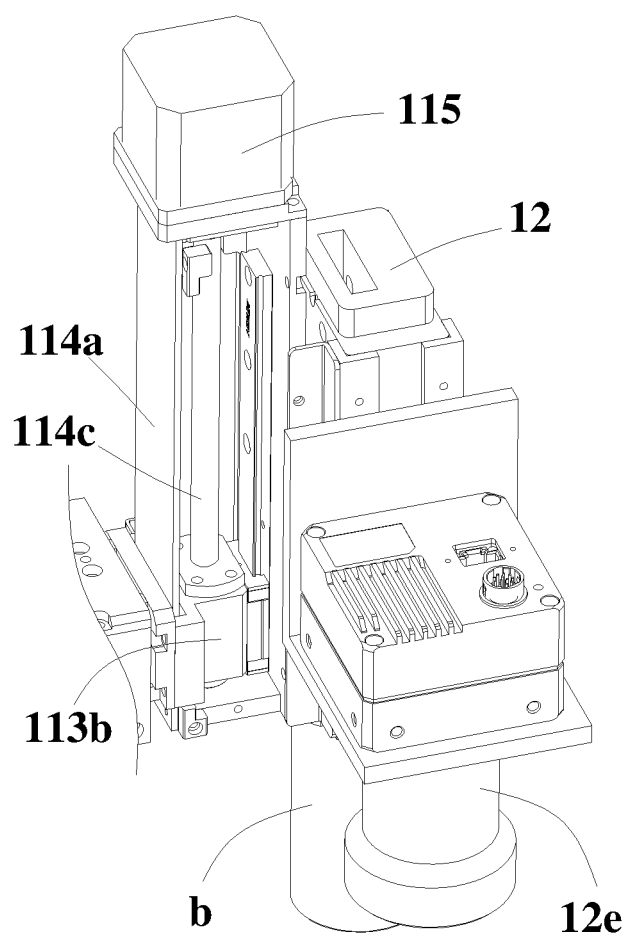
FIG. 13 is a perspective view of a Y-axis displacement assembly according to Embodiment 1 of the present disclosure (with a part of components not shown)
Figure 17:
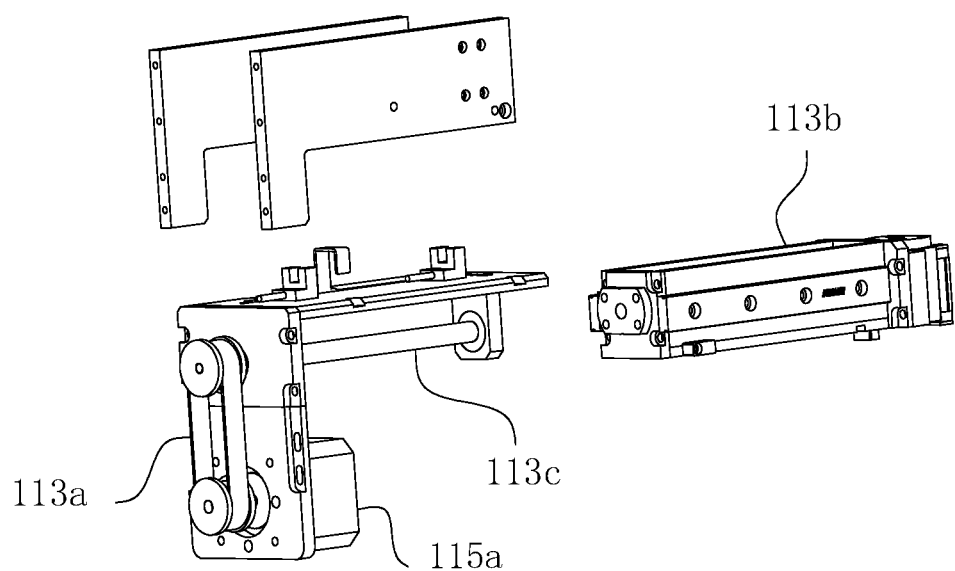
FIG. 17 is an exploded view of the assembly in FIG. 16.

As shown in FIG. 10, FIG. 12 and FIG. 17, the X-axis frame 113a further includes a mounting plate at rear ends of the two L-shaped plates. A first motor 115a is arranged on the mounting plate. The first motor 115a is connected to a rear end of the X-axis screw rod 113c through the first endless belt 113d. The first motor 115a can drive the X-axis screw rod 113c to rotate. The Y-axis displacement assembly 114 is arranged at a front end of the X-axis movable member 113b.

Refer to FIG. 10, FIG. 13, FIG. 18 and FIG. 19, the Y-axis displacement assembly 114 includes a Y-axis frame 114a. The Y-axis frame 114a is slidably provided at the movable end of the X-axis displacement assembly 113. Further, the Y-axis frame 114a includes two parallel long plates which are connected through two Y-axis movable members 114b. The Y-axis movable members 114b each are also of a long plate structure. Specifically, a sliding rail perpendicular to a moving direction of the X-axis displacement assembly 113 is provided on the Y-axis frame 114a. An end portion of the X-axis movable member 113b is provided with a slider cooperated with the sliding rail. A Y-axis screw rod 114c is rotatably mounted to the Y-axis frame 114a. A rear end of the Y-axis frame 114a is provided with a second motor 115b connected to the Y-axis screw rod 114c. The Y-axis screw rod 114c is threadedly connected to the nut on the X-axis movable member 113b. The second motor 115b can drive the Y-axis screw rod 114c to rotate, and can operate synchronously with the first motor 115a to respectively allow the X-axis displacement assembly 113 and the Y-axis displacement assembly 114 stop at a position. Further, two photoelectric switches are arranged on the Y-axis frame 114a. Baffles cooperated with the photoelectric switches are provided on the X-axis movable member 113b. Through cooperation between the photoelectric switches and the baffles, extreme positions in a travel of the Y-axis movable member 114a are limited.

Figure 18:
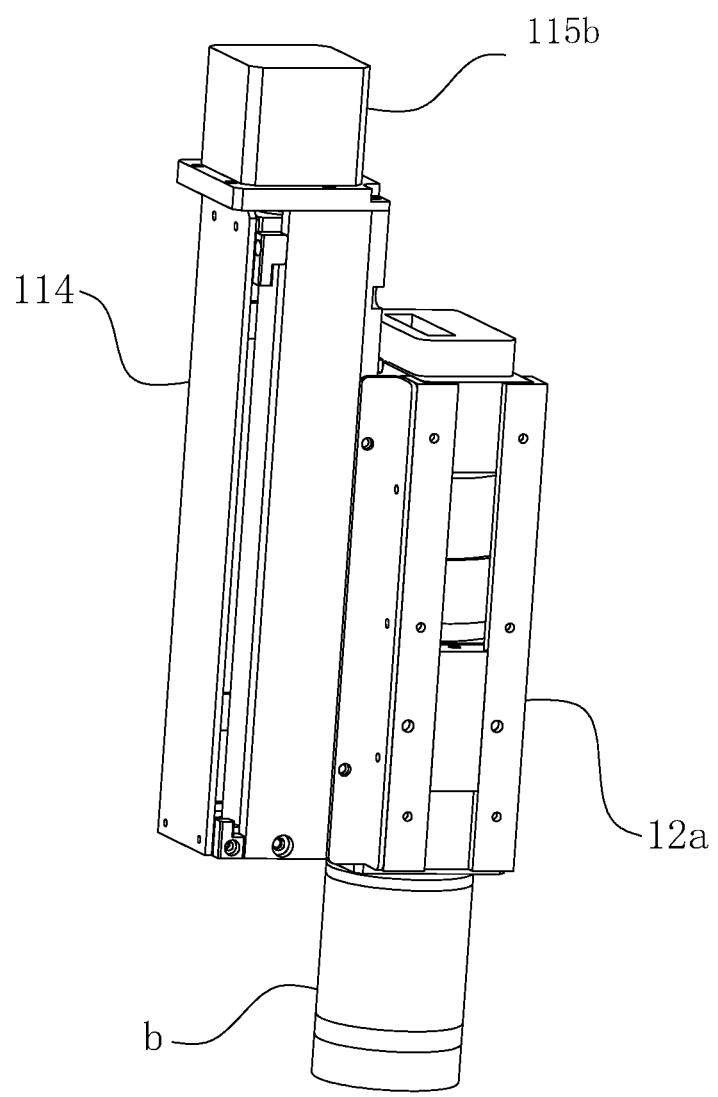
FIG. 18 is a perspective view of a Y-axis displacement assembly and a working head according to Embodiment 1 of the present disclosure.
Figure 19:
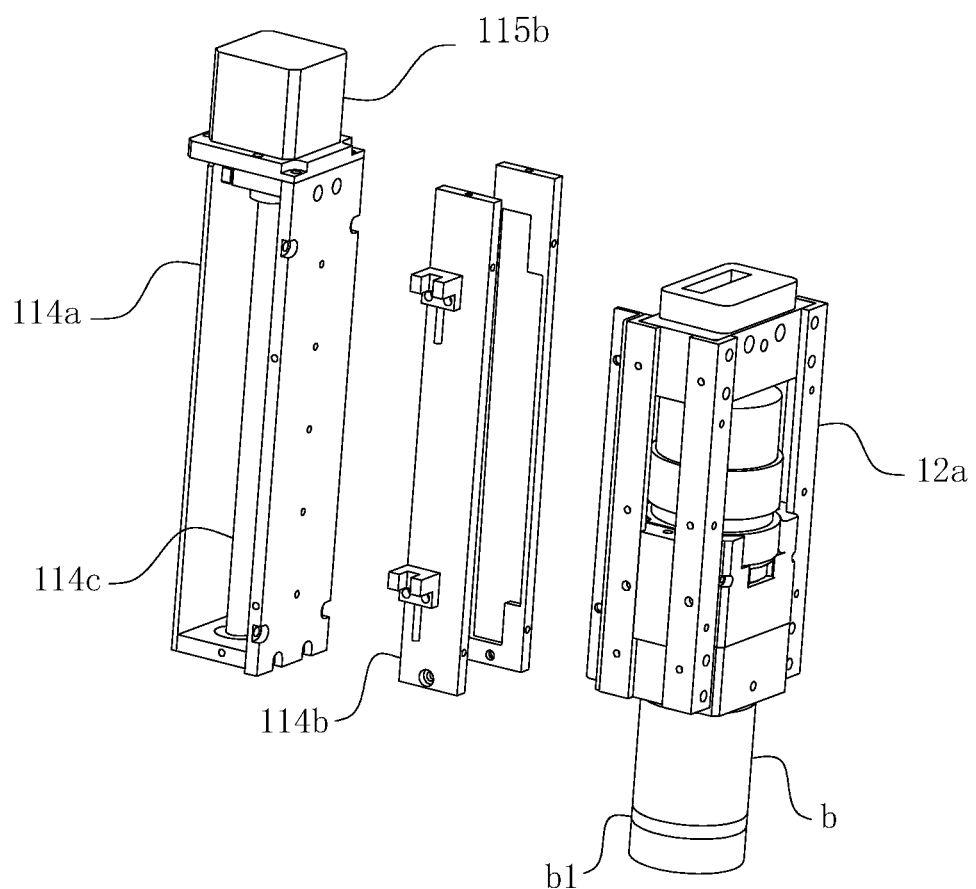
FIG. 19 is an exploded view of the structure in FIG. 18.
Figure 20:
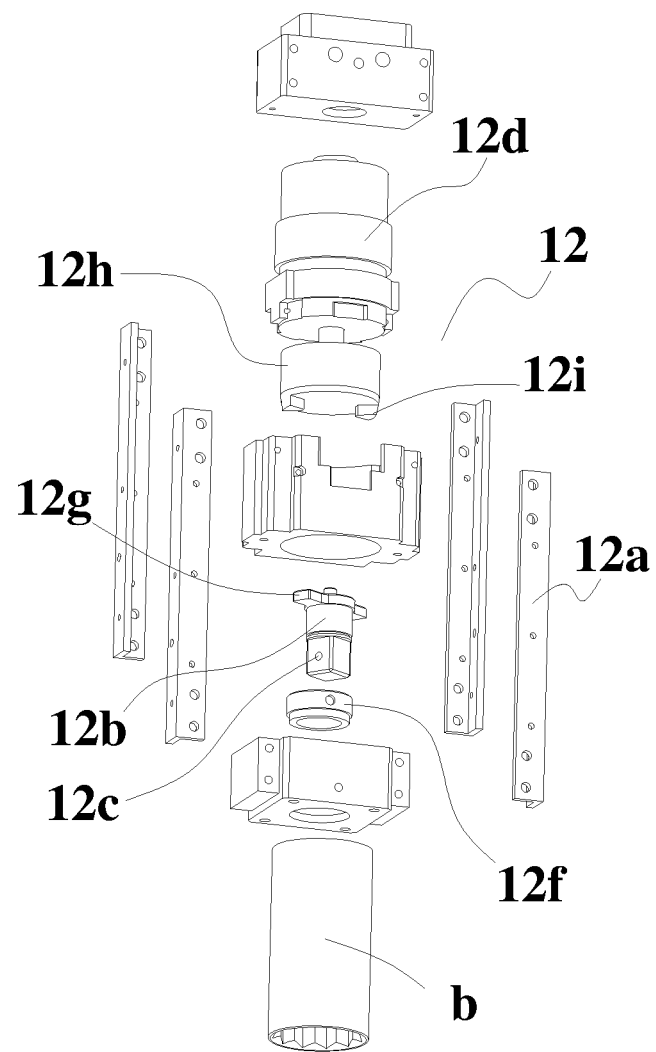
FIG. 20 is a perspective view of a working head according to Embodiment 1 of the present disclosure.

As shown in FIGS. 18-20, the working head 12 includes a striking seat 12 and a motor for striking 12d arranged on the striking seat 12a. Specifically, the striking seat 12a and the X-axis movable member 113b are respectively located at two sides of the Y-axis frame 114a. The striking seat 12a is of a rectangular frame structure, and fixedly connected to the Y-axis frame 114a. The motor for striking 12d is located within a frame of the striking seat 12a. An axis of the motor for striking 12d is parallel to the moving direction of the Y-axis displacement assembly 114. A striking anchor rod 12b is rotatably mounted to the striking seat 12a. The motor for striking 12d can drive the striking anchor rod 12b to rotate. A sleeve b is mounted to the striking anchor rod 12b. Specifically, an end portion of the sleeve b is provided with a detaching hole b2 fitted with the striking anchor rod 12b. Both the striking anchor rod 12b and the detaching hole b2 have a rectangular section.

Further, as shown in FIG. 20, the striking anchor rod 12b is rotatably mounted to the striking seat 12a through a rotating shaft sleeve 12f. Two striking lugs 12g are symmetrically provided at two sides of an end portion of the striking anchor rod 12b. A striking head 12h is mounted to an output shaft of the motor for striking 12d. A key is fixed to the output shaft of the motor for striking 12d. A chute fitted with the key is formed in a through hole of the striking head 12h, such that the output shaft of the motor for striking 12d can drive the striking head 12h to rotate circumferentially, and the striking head 12h can reciprocate axially. A spring is sleeved on the output shaft of the motor for striking 12d, which is located between the striking head 12h and the motor for striking 12d. Two striking bumps 12i are symmetrically provided on an end portion of the striking head 12h, and configured to impact the striking lugs 12g. Circumferential widths of end portions of the striking bumps 12i are less than that of root portions of the striking bumps. As a result, after the striking bump 12i impacts the striking lugs 12g and the motor for striking 12d applies a torque continuously, the striking head 12h is drawn back to compress the spring. After getting over the striking bump 12g, the striking bumps 12i are moved toward the striking anchor rod 12b under an action of the spring. The striking bumps 12i impact the striking lugs 12g again, thereby retightening a bolt through the sleeve b.

The sleeve b is routine. Further, an elastic pin 12c capable of extending or retracting along a direction perpendicular to the striking anchor rod 12b is provided at a side of the striking anchor rod 12b. The detaching hole b2 of the sleeve b is cooperated with the striking anchor rod 12b, and sleeve b is provided therein with a clamping groove. When the sleeve b is sleeved on the striking anchor rod 12b, the elastic pin 12c is inserted into the clamping groove for fixation.

Further, as shown in FIG. 10, a camera 12e is provided at an upper side of the striking seat 12a. A lens of the camera 12e faces toward the sleeve b, so as to observe an operation of the sleeve b.

Further, the working head 12 may also be an electric impact wrench in the prior art, for ease of driving the sleeve b to rotate to screw the bolt.

Figure 21:
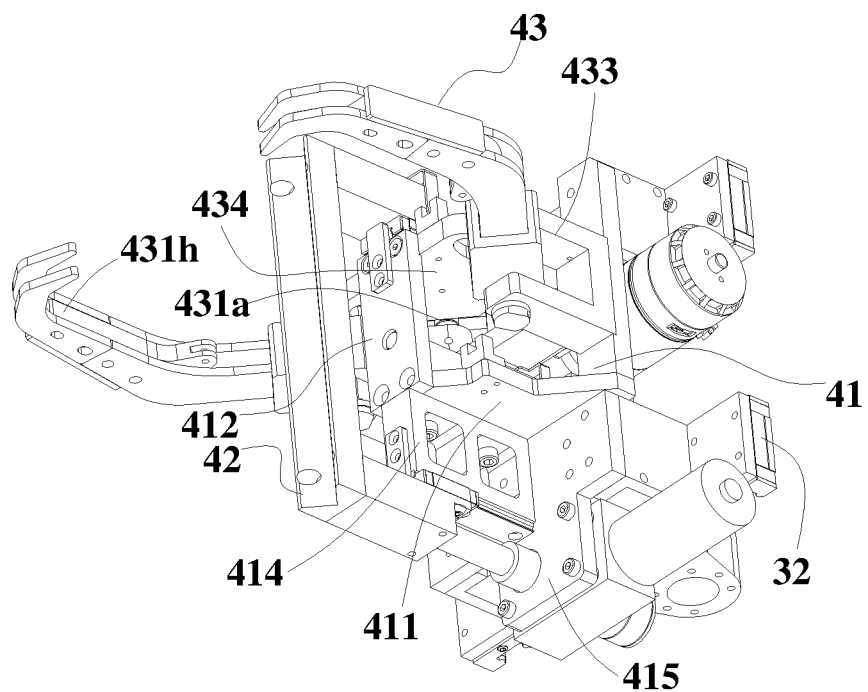
FIGS. 21-22 each are a perspective view of a clamping device according to Embodiment 1 of the present disclosure (in a clamped state)
Figure 27:
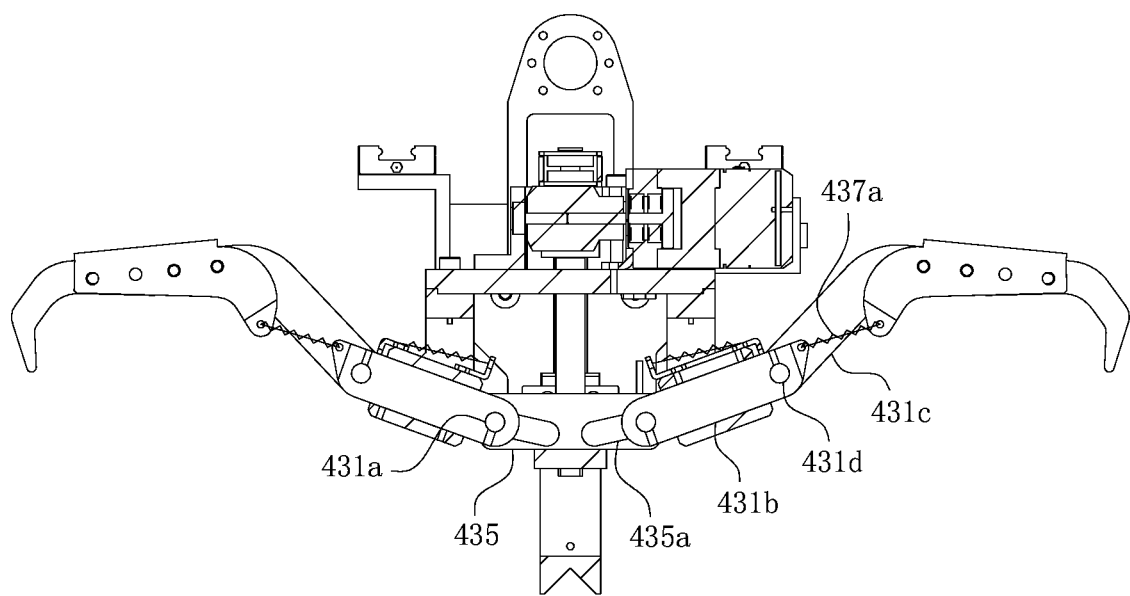
FIG. 27 is a sectional view of FIG. 26.

As shown in FIG. 21 and FIG. 27, the clamping devices 40 each include a fixed seat 41. The fixed seat 41 is swingably provided with a pair of claw bars 431 which each include a rear bar body 431b and a front bar body 431c hinged together. When the two claw bars 431 are opened, an inner angle between the rear bar body 431b and the front bar body 431c is greater than 180°.

Preferably, at least two clamping devices 40 are provided, and at least one clamping device 40 can slide back and forth relative to the main machine 30. Specifically, as shown in FIG. 8, two clamping devices 40 are provided in the embodiment. The upper clamping device 40 can slide up and down relative to the main machine 30, and the lower clamping device 40 is fixed to a bottom front side of the main machine 30.

As shown in FIG. 8, the upper clamping device 40 which can slide back and forth relative to the main machine 30 is provided thereon with a slider 32. A pair of sliding rails 31 are vertically provided at the front side of the main machine 30. The slider 32 is slidably mounted to the sliding rails 31. A clamping device driving assembly is provided on the main machine 30 and configured to drive the upper clamping device 40 to slide up and down.

As shown in FIG. 8 and FIG. 9, the main machine 30 is of a rectangular frame structure, and the clamping device driving assembly is located inside a frame of the main machine 30. Specifically, the clamping device driving assembly includes a sliding screw rod 33 and a motor for sliding 35 arranged on the main machine 30. The clamping device 40 which can slide back and forth relative to the main machine 30 is provided thereon with a sliding sleeve 34 which is extended backward into the frame of the main machine 30. A through hole whose axis runs along the vertical direction is formed in the sliding sleeve 34, and a nut is provided in the through hole. The sliding screw rod 33 is rotatably provided inside the frame of the main machine 30. The sliding screw rod 33 is provided vertically, and is threadedly connected to the nut in the sliding sleeve 34. The motor for sliding 35 is located at an inner bottom of the frame of the main machine 30, with an output shaft vertically upward. The sliding screw rod 33 is connected to the output shaft of the motor for sliding 35.

As shown in FIG. 21, the clamping devices 40 each include the fixed seat 41, a pressing member 42, and a clamping member 43.

The clamping member 43 is provided at a front side of the fixed seat 41. In the embodiment, the fixed seat 41 is configured to provide mounting positions for other parts, and is not limited to a special shape, provided that it can provide the mounting positions for other parts and allows the parts to cooperate with each other to implement corresponding functions. As shown in FIG. 21, the fixed seat 41 is of a vertical plate-like structure in the embodiment. A bottom plate 411 is provided at a bottom of the fixed seat 41. A vertical plate 412 is vertically provided at a front end of the bottom plate 411.

Figure 23:
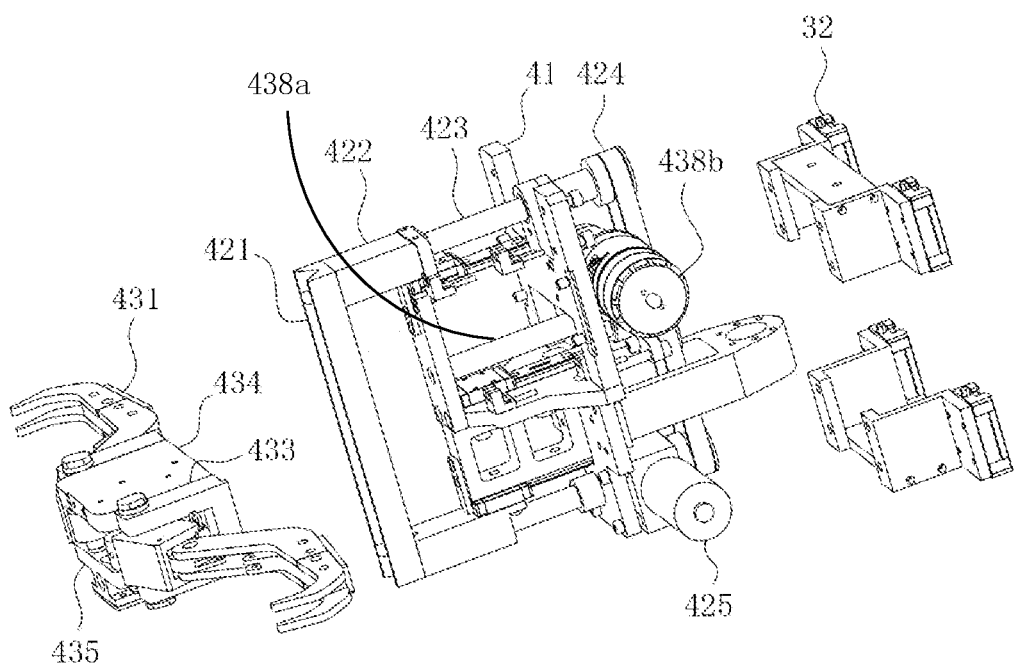
FIGS. 23-24 each are an exploded view of a clamping device according to Embodiment 1 of the present disclosure (in an opened state)

As shown in FIG. 23, the clamping member 43 includes the pair of claw bars 431 swingably provided on the fixed seat 41. As shown in FIG. 27, the claw bars 431 each include the rear bar body 431b and the front bar body 431c that are hinged together through a plumbed shaft 431d. When the two claw bars 431 are opened, the inner angles between the rear bar bodes 431b and the front bar bodies 431c are greater than 180°.

Figure 26:
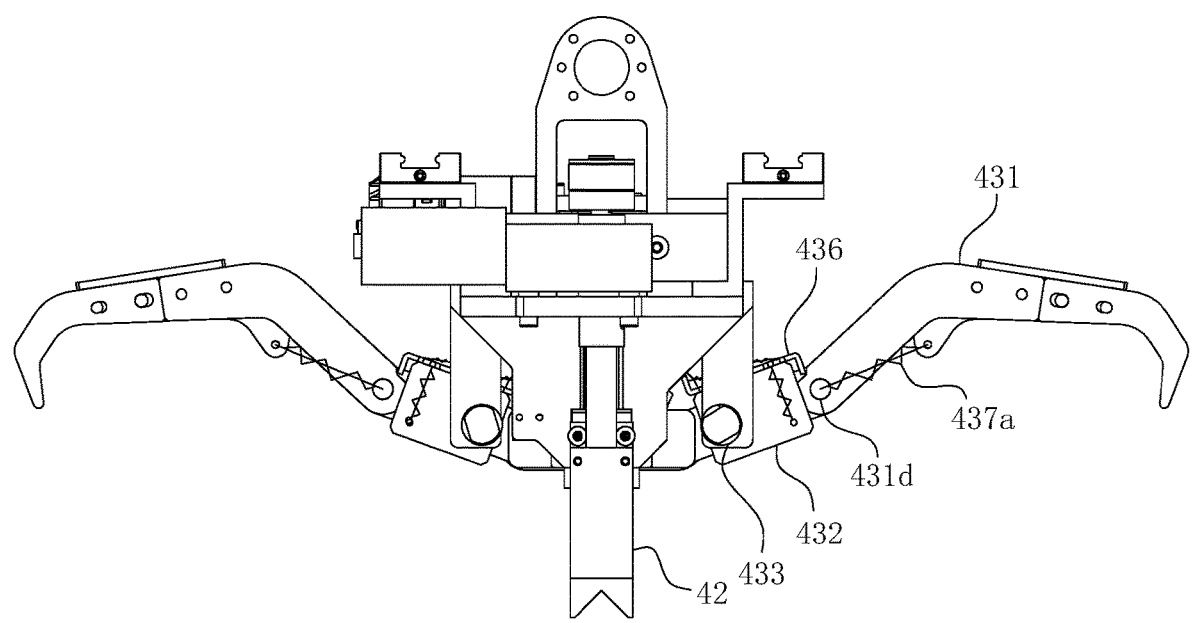
FIG. 26 is a schematic structural view of a clamping device with claw bars in an opened state according to Embodiment 1 of the present disclosure.

Further, as shown in FIG. 26, a pair of swing guide sleeves 432 are hinged to the fixed seat 41. Specifically, two plumbed hinge seats 433 are respectively arranged at left and right front sides of the fixed seat 41. As shown in FIG. 21, the plumbed hinge seats 433 each are of a transverse U-shaped structure, with an opening forward. Each of the swing guide sleeves 432 is hinged in the opening of the respective plumbed hinge seat 433 through upper and lower coaxial hinge shafts which are vertical in the plumbed hinge seat 433. Further, as shown in FIG. 22, hinge positions of the swing guide sleeves 432 are located at inner ends of the swing guide sleeves 432.

As shown in FIG. 21, the swing guide sleeves 432 each are of a rectangular square tube structure and provided with a rectangular through hole inside. The rear bar bodies 431b are slidably mounted in the rectangular through hole of the respective swing guide sleeves 432. The rear bar bodies 431b have rectangular sections in sliding fit with the rectangular through holes of the swing guide sleeves 432 and ends of the front bar bodies 431c hinged with the rear bar bodies 431b also have rectangular sections in sliding fit with the rectangular through holes of the swing guide sleeve 432.

Figure 22:
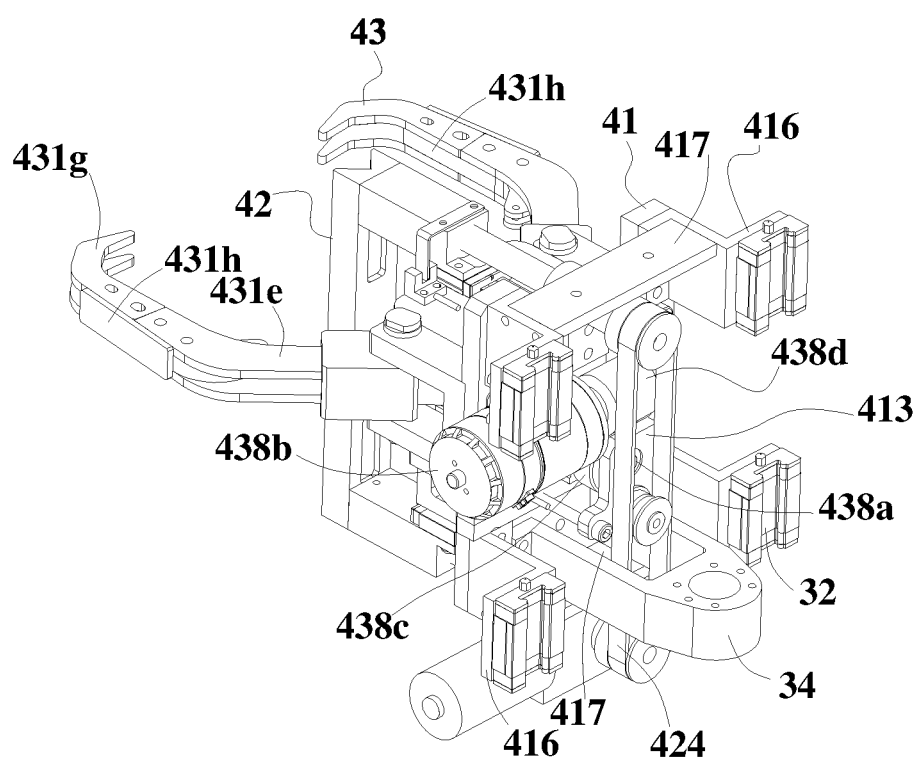

Further, as shown in FIG. 22, each front bar body 431c includes upper and lower symmetrical groups of intermediate claw parts 431e and claw heads 431g which are connected through a clamping claw connecting member 431h. Specifically, the intermediate claw parts 431e each are of a sheet structure which is bent outward from a middle and has two straight end portions. The claw heads 431g each are of a sheet structure which has a middle portion bent outward. End portions of the intermediate claw parts 431e and the claw heads 431g are mounted to the clamping claw connecting member 431h through bolts. The clamping claw connecting member 431h has a transverse T-shaped section. The two groups of intermediate claw parts 431e and claw heads 431g are respectively provided at upper and lower sides of the clamping claw connecting member 431h. Outer sides of the end portions of the intermediate claw parts 431e and the claw heads 431g abut against an inner side of the clamping claw connecting member 431h. With such a structure, the claw heads 431g can be replaced flexibly to meet different use requirements.

As shown in FIG. 23, a push-pull plate 435 is slidably mounted to the fixed seat 41. Specifically, a guide rail in a front-back direction is provided on the bottom plate 411. A bottom of the push-pull plate 435 is provided with a slider which is slidably mounted to the guide rail. The bottom plate 411 is further provided with two photoelectric switches which are respectively located at front and rear extreme positions in a travel of the push-pull plate 435. Baffles cooperated with the two photoelectric switches are provided on the push-pull plate 435 so as to limit a front-back sliding travel of the push-pull plate 435.

Figure 30:
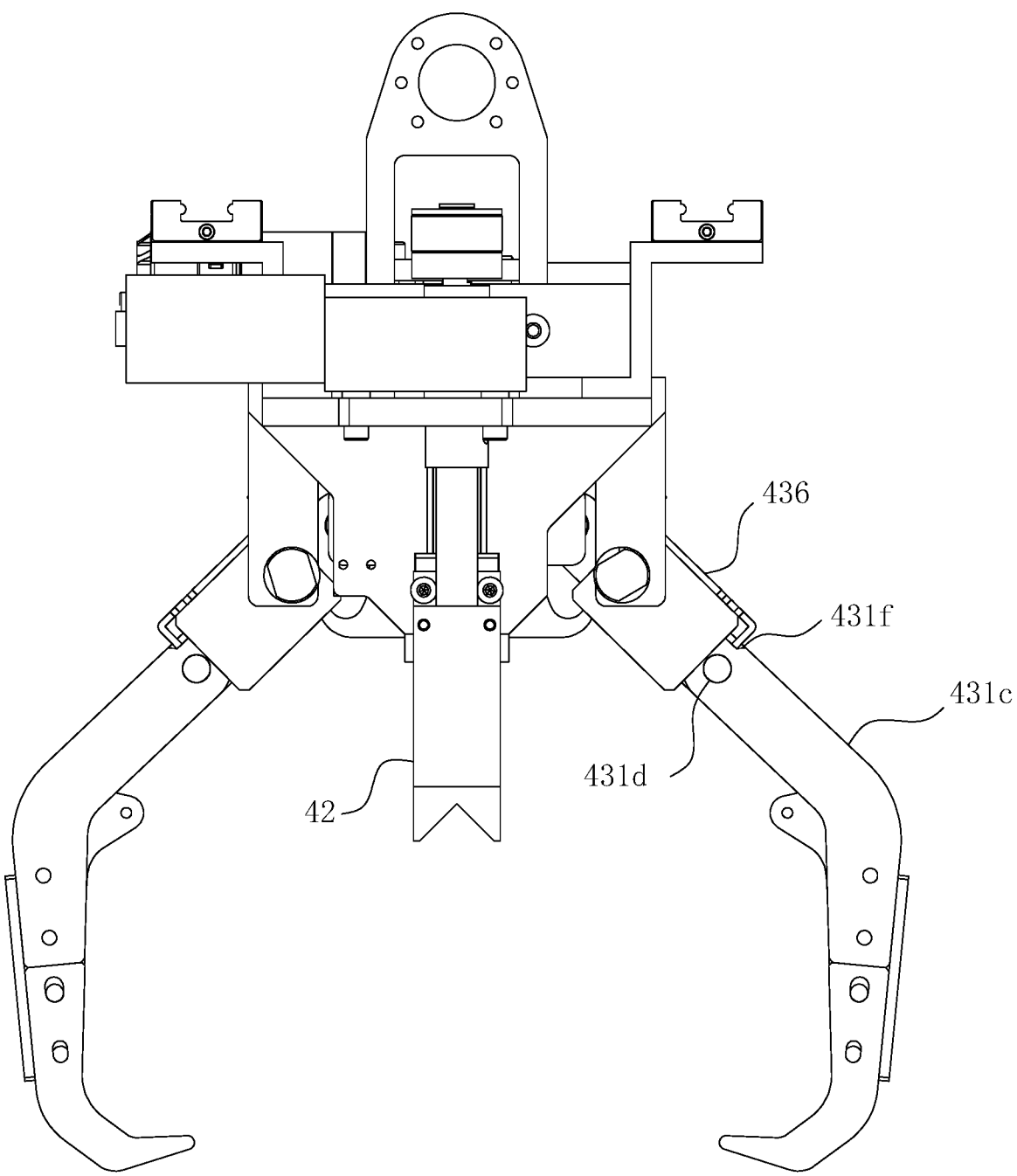
FIG. 30 is a schematic structural view showing claw bars in a clamped state according to Embodiment 1 of the present disclosure.
Figure 31:
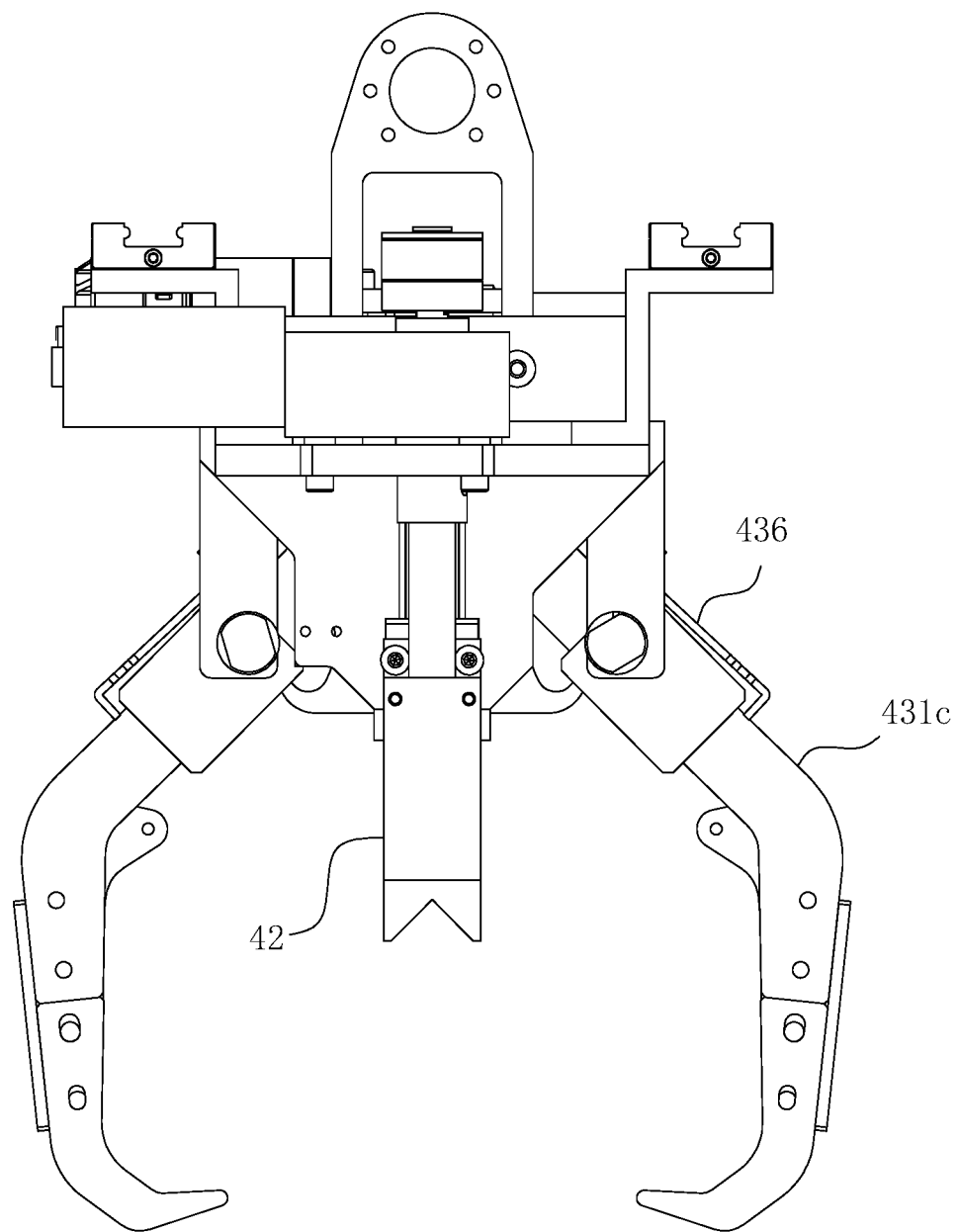
FIG. 31 is a schematic structural view showing claw bars in a clamped state according to Embodiment 1 of the present disclosure.

The push-pull plate 435 can pull the rear bar body 431b, such that a hinged position between the rear bar body 431b and the front bar body 431c is pulled to the swing guide sleeve 432 to realize clamping of the two claw bars 431, namely a state as shown in FIG. 30 and FIG. 31. The push-pull plate 435 can push the rear bar body 431b, such that the hinged position between the rear bar body 431b and the front bar body 431c is pushed out of the swing guide sleeve 432 to realize opening of the two claw bars 431.

Specifically, as shown in FIG. 27, a top surface of the push-pull plate 435 is provided with a pair of symmetrical guiding grooves 435a which each are of an oblique linear shape. A spacing between the two guiding grooves 435a increases from front to back, with a backward opened shape.

As shown in FIG. 21 and FIG. 23, the fixed seat 41 is provided with a mounting plate 434 which is of a horizontal plate-like structure. A front end of the mounting plate 434 is connected to a top end of the vertical plate 412 through bolts. The mounting plate 434 is located above the push-pull plate 435.

Figure 32:
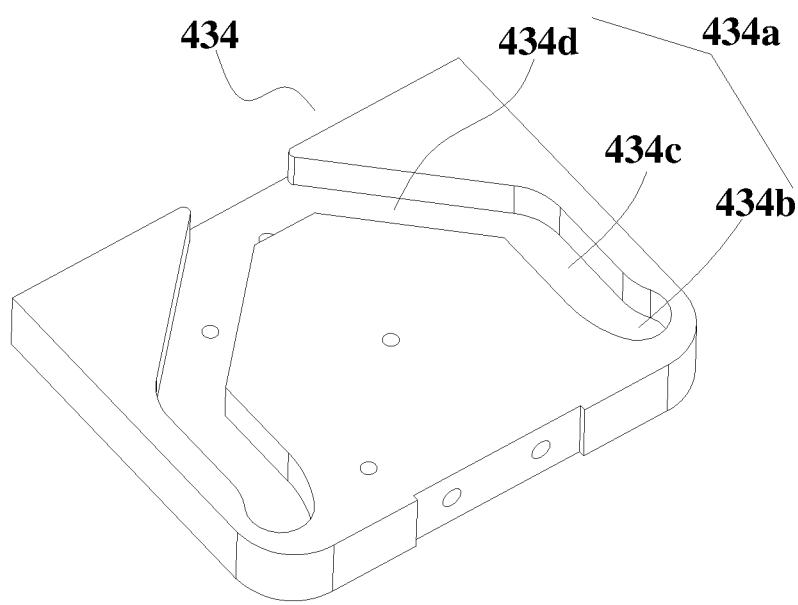
FIG. 32 is a perspective view of a mounting plate according to Embodiment 1 of the present disclosure.

As shown in FIG. 32, a bottom surface of the mounting plate 434 is provided with a pair of symmetrical orientation grooves 434a which, from front to back, each include a bending segment 434b, a linear segment 434c, and an oblique segment 434d that are communicated with each other. The three segments are in filleted transition. A front end of the bending segment 434b bends outward. The linear segment 434c is in a front-back direction. A rear end of the oblique segment 434d is inclined inward. The rear ends of the oblique segments 434d of the two orientation grooves 434a are communicated with each other.

As shown in FIG. 21, an end portion of each rear bar body 431b is provided with a plumbed push-pull shaft 431a along the vertical direction. Two ends of the plumbed push-pull shafts 431a are slidably provided in the guiding grooves 435a and the orientation grooves 434a, respectively. Further, the two ends of the plumbed push-pull shafts 431a each are rotatably provided with a rolling member. The two ends of the plumbed push-pull shaft 431a are slidably arranged in the guiding grooves 435a and the orientation grooves 434a through the rolling members. The rolling members each may be a sliding sleeve, a rolling bearing, a roller, or like.

As shown in FIG. 22 and FIG. 23, the fixed seat 41 is provided with a push-pull driving assembly which can drive the push-pull plate 435 to move back and forth. Further, the push-pull driving assembly includes a push-pull screw rod 438a rotatably mounted to the fixed seat 41. The push-pull screw rod 438a runs in the front-back direction, and a front end of the push-pull screw rod 438a is rotatably mounted to the vertical plate 412. The push-pull screw rod 438a is threadedly and rotatably mounted to the push-pull plate 435. The push-pull driving assembly further includes a motor for pushing and pulling 438b arranged on the fixed seat 41. The motor for pushing and pulling 438b is connected to the push-pull screw rod 438a through a second worm gear and worm assembly.

An opening angle between the two claw bars 431 is adjustable. Specifically, the motor for pushing and pulling 438b drives the push-pull screw rod 438a to rotate so as to drive the push-pull plate 435 to move back and forth. By stopping the push-pull plate 435 at different positions, the opening angle between the two claw bars 431 can be adjusted to a required angle so as to meet different clamping angles or avoidance requirements.

Specifically, as shown in FIG. 22, a mounting frame 413 is provided at a rear side of the fixed seat 41. A rear end of the push-pull screw rod 438a is rotatably mounted to the mounting frame 413 passing through the fixed seat 41. A second worm gear 438c is provided at the rear end of the push-pull screw rod 438a. The motor for pushing and pulling 438b is provided at the rear side of the fixed seat 41. The output shaft of the motor for pushing and pulling 438b is provided with a second worm 438d which is horizontally provided above the second worm gear 438c and cooperated with the second worm gear 438c. The second worm gear and worm assembly comprises the second worm gear 438c and the second worm 438d.

Figure 28:
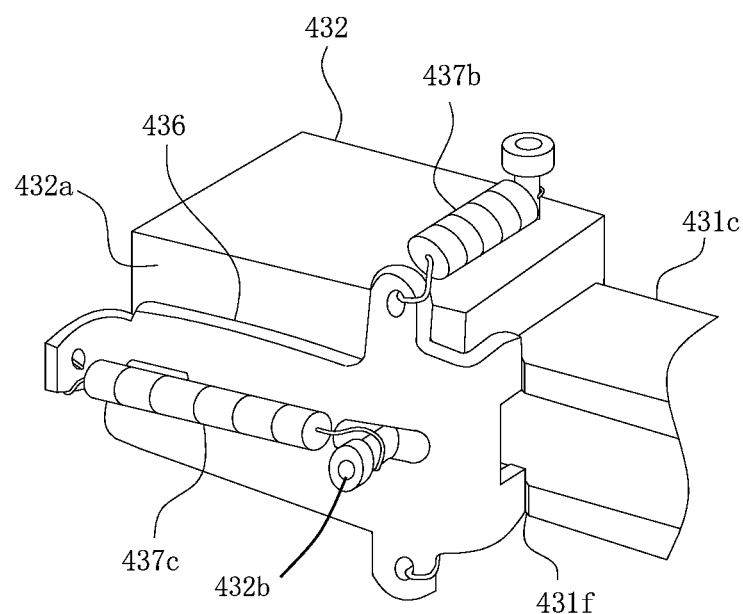
FIG. 28 is a view in which a limiting elastic piece is cooperated with a front bar body in a state shown in FIG. 26.

As shown in FIG. 26 and FIG. 28, the swing guide sleeves 432 each are provided with a limiting elastic piece 436. A gap 431f fitted with the limiting elastic piece 436 is formed in the front bar body 431c. When the hinge position between the rear bar body 431*b* and the front bar body 431*c* is pushed out of the respective swing guide sleeve 432, the limiting elastic piece 436 can be clamped into the gap 431*f*, and thus the inner angle between the rear bar body 431*b* and the front bar body 431*c* is greater than 180°.

Figure 29:
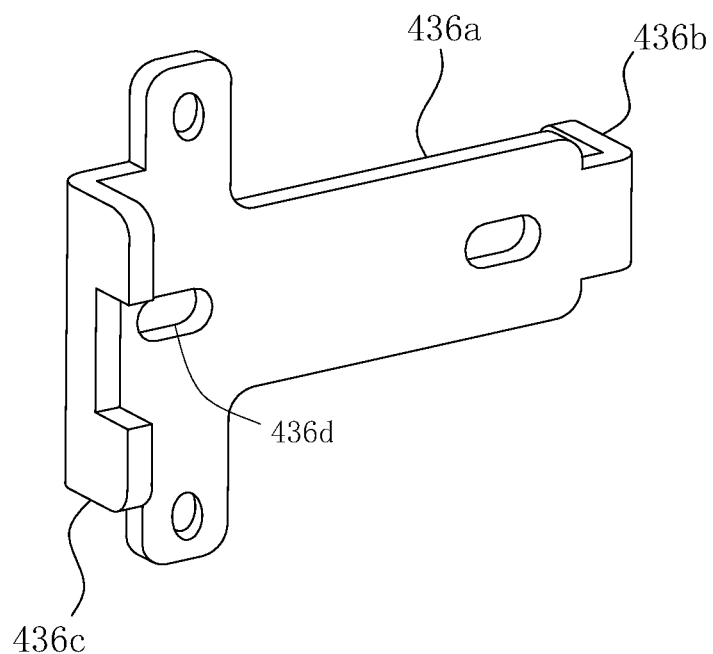
FIG. 29 is a perspective view of a limiting elastic piece according to Embodiment 1 of the present disclosure.

Specifically, as shown in FIG. 28 and FIG. 29, the limiting elastic piece 436 is located on a cooperated wall 432*a* outside the swing guide sleeve 432. A main body of the limiting elastic piece 436 is of a sheet structure attached outside the respective swing guide sleeve 432, and includes a horizontal plate segment 436*a*. A first end of the limiting elastic piece 436 comprises upper and lower inward bending portions 436*c* which are pressed against an outer side of the front bar body 431*c*. The gap 431*f* is located on an outer side of an end of the front bar body 431*c* hinged with the rear bar body 431*b*. Specifically, the gap 431*f* is formed on an outer side of hinge positions of each group of intermediate claw parts 431*e*.

Further, as shown in FIG. 28, the swing guide sleeves 432 each are provided on an outer side with a fixed post 432*b* perpendicular to the respective swing guide sleeve 432. An elongated hole 436*d* is formed in the limiting elastic piece 436. A length direction of the elongated hole 436*d* is parallel to a guiding direction of the respective swing guide sleeve 432. The fixed post 432*b* is located in the elongated hole 436*d*. A second end of the limiting elastic piece 436 is provided with an outward bending connecting lug 436*b*. An axial tension spring 437*c* is connected between the connecting lug 436*b* and the fixed post 432*b*.

Further, as shown in FIG. 28, radial tension springs 437*b* is provided between the limiting elastic piece 436 and the respective swing guide sleeves 432. Specifically, each swing guide sleeve 432 is provided with connecting posts arranged on upper and lower surfaces. The limiting elastic piece 436 is provided with two connecting lugs symmetrically provided at upper and lower edges. The two connecting lugs are connected to the corresponding connecting posts through the radial tension springs 437*b*. The limiting elastic piece 436 can be pressed against the respective swing guide sleeve 432 through the radial tension springs 437*b*.

Further, as shown in FIG. 26 and FIG. 27, a reset tension spring 437*a* is provided between the rear bar body 431*b* and the front bar body 431*c*. The front bar body 431*c* can swing outward around an end portion of the rear bar body 431*b* by means of the reset tension spring 437*a*. Specifically, an end of the clamping claw connecting member 431*h* closer to the rear bar body 431*b* bends inward, and the bending end is provided with a connecting hole. A connecting hole is also formed in an outer side of a hinged end portion of the rear bar body 431*b*. Two ends of the reset tension spring 437*a* are connected to the two connecting holes, respectively.

Further, referring to FIGS. 21-25, the pressing member 42 is provided on the fixed seat 41. A movable part of the pressing member 42 is located between root portions of the two claw bars 431. The movable part of the pressing member 42 can slide away from or close to a clamping area between head portions of the two claw bars 431.

Specifically, the movable part of the pressing member 42 includes a V-shaped portion 421 slidably mounted to the fixed seat 41. The V-shaped portion 421 can slide back and forth. The V-shaped portion 421 is of a vertical stripped structure, and provided with a V-shaped groove in a front side. The V-shaped groove is vertical, and has a forward opening. Further, a rubber pad is provided on an inner wall of the V-shaped groove.

The pressing member 42 includes a V-shaped portion driving assembly arranged on the fixed seat 41. The V-shaped portion driving assembly includes threaded inserts 422, threaded rods 423, a third endless belt 424, and a third motor 425. The threaded inserts 422 are respectively provided behind upper and lower ends of the V-shaped portion 421. An axis of each of the threaded inserts 422 is in the front-back direction.

A slider is provided below a rear end of the upper threaded insert 422. A guide rail is provided on a top of the mounting plate 434 along the the front-back direction. The slider is slidably mounted on the guide rail. Further, the top of the mounting plate 434 is provided with front and rear photoelectric switches which are respectively located at extreme positions in a front-back travel of the upper threaded insert 422. Baffles cooperated with the photoelectric switches are provided at the rear end of the upper threaded insert 422. The baffles are cooperated with the photoelectric switches to limit the front-back travel of the threaded inserts 422.

A slider is provided above a rear end of the lower threaded insert 422. As shown in FIG. 21, a front mounting seat 414 and a rear mounting seat 415 are sequentially arranged on a bottom of the bottom plate 411. The front mounting seat 414 is of a vertical plate-like structure along the front-back direction, particularly a hollowed-out transverse θ-shaped structure. The front mounting seat 414 is perpendicular to the rear mounting seat 415. The rear mounting seat 415 is of a T-shaped vertical plate-like structure. A guide rail is provided on a bottom of the front mounting seat 414 along the front-back direction. The slider provided above the rear end of the lower threaded insert 422 is slidably mounted to the guide rail.

Figure 24:
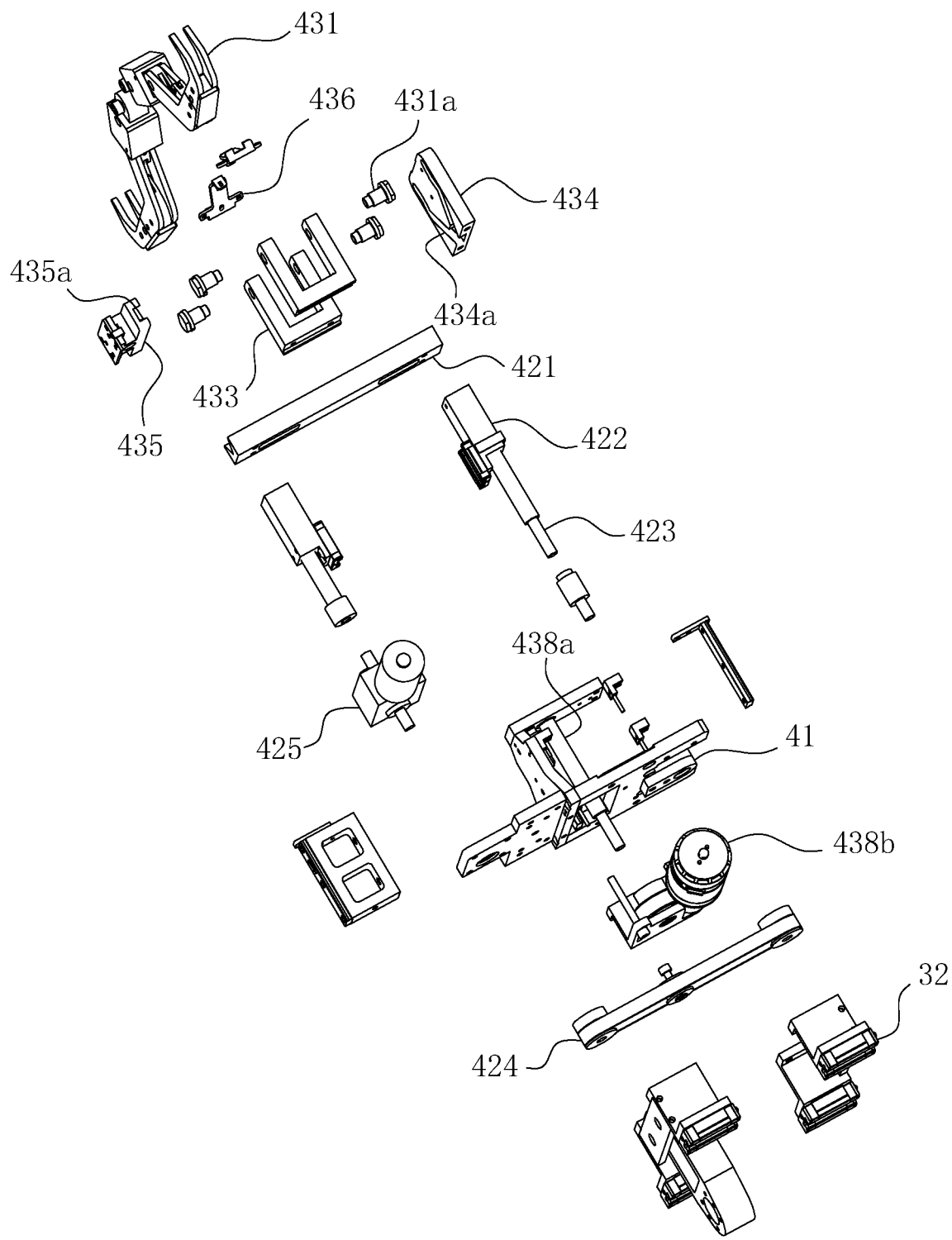
Figure 25:
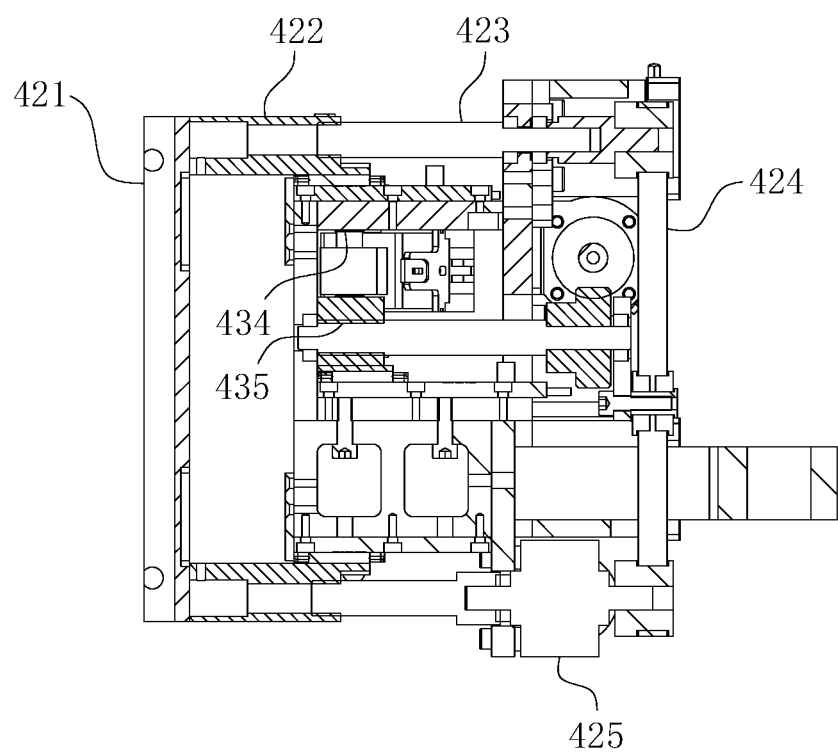
FIG. 25 is a sectional view of a clamping device according to Embodiment 1 of the present disclosure (in an opened state)

As shown in FIGS. 23-25, the threaded rods 423 are rotatably provided at a top of the fixed seat 41 and at a lower portion of the rear mounting seat 415, respectively. The threaded rods 423 are threadedly connected to the two threaded inserts 422. A third belt pulley is provided at a rear end of each of the threaded rods 423. The third endless belt 424 is wound on the two third belt pulleys. The third motor 425 is provided at a lower rear side of the rear mounting seat 415. The third motor 425 drives the lower threaded rod 423 and the third belt pulley to rotate.

Further, a worm gear may be provided at the rear end of the lower threaded rod 423. A worm is provided on an output shaft of the third motor 425. The worm is cooperated with the worm gear, such that the third motor 425 drives the lower threaded rod 423 and the third belt pulley to rotate.

Further, as shown in FIG. 21 and FIG. 22, two rear sides of the top of the fixed seat 41 each are provided with a connecting plate 416. A horizontal reinforcing plate 417 is provided between the two connecting plates 416.

As shown in FIG. 21 and FIG. 22, two rear sides of an upper portion of the rear mounting seat 415 each are provided with a further connecting plate 416. A further horizontal reinforcing plate 417 is provided between the two further connecting plates 416.

In actual applications, as shown in FIG. 8, the four connecting plates 416 of the lower clamping device 40 are fixed to a front side of the bottom of the main machine 30.

Further, as shown in FIG. 21 and FIG. 22, sliders 32 are arranged at a rear side of the fixed seat 41 of the upper slidable clamping device 40. Specifically, as shown in FIG. 21 and FIG. 22, there are four sliders 32 that are respectively behind the four connecting plates 416. Two upper sliders 32 are located directly above two lower sliders 32. A chute is formed in each of the sliders 32 along the vertical direction.

Further, as shown in FIG. 22, a U-shaped sliding sleeve 34 is provided on a rear upper portion of the rear mounting seat 415. The sliding sleeve 34 is located between two lower connecting plates 416, with an opening forward. The third endless belt 424 vertically passes through the opening of the sliding sleeve 34. A nut having an axis along the vertical direction is provided at a rear end of the sliding sleeve 34 to cooperate with the sliding screw rod 33, such that the sliding screw rod 33 drives the sliding sleeve 34 so as to drive the upper clamping device 40 to move according to an actual need.

Figure 6:
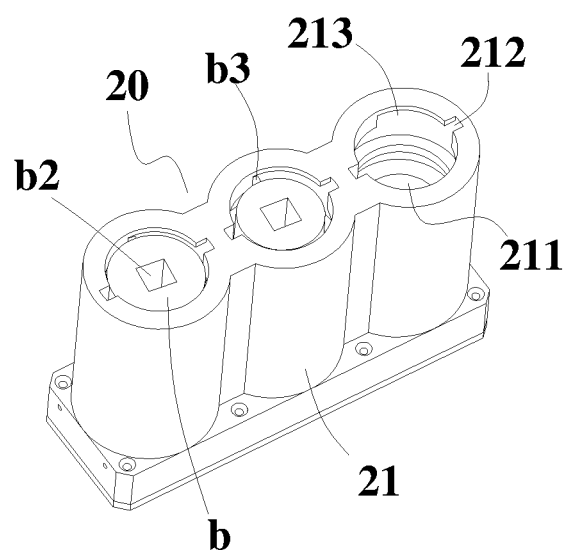
FIG. 6 is a perspective view of an auxiliary sleeve replacement box according to Embodiment 1 of the present disclosure.

The bolt retightening device 10 can replace different sleeves b from the auxiliary sleeve replacement box 20. Specifically, as shown in FIG. 6, the auxiliary sleeve replacement box 20 in the embodiment includes a box body 21 which is provided with a plurality of accommodating holes 211. The sleeves b are movably provided in the accommodating holes 211. The box body 21 is not limited to a special shape, provided that it can accommodate the sleeves b and limit the sleeves. In the embodiment, the box body 21 includes a rectangular blocky mounting seat and three cylindrical parts on the mounting seat. The three cylindrical parts are integrally formed. The three cylindrical parts each are provided with one accommodating hole 211. The three accommodating holes 211 are lined up. The sleeves b are inserted into the respective accommodating holes 211 with detaching holes b2 facing outward.

As shown in FIG. 2, a locating bump b3 is provided at a side edge of each of the sleeves b. As shown in FIG. 6, a notch 212 for passing the locating bump b3 through is formed at an opening of each accommodating hole 211. A retaining groove 213 extending along a circumferential direction of the accommodating hole 211 is formed at inner side of the notch 212. When a sleeve b is inserted into the corresponding accommodating hole 211, the locating bump b3 can pass through the notch 212 and rotate into the retaining groove 213. The retaining groove 213 can retain the locating bump b3 to prevent the sleeve b from escaping from the corresponding accommodating hole 211. In the embodiment, specifically, there are two symmetrical locating bumps b3 arranged at the side edge of one sleeve b, as well as two notches 212 and two retaining grooves 213 arranged at the opening of the corresponding accommodating hole 211. The two notches 212 and two retaining grooves 213 are centrosymmetric with respect to the opening of the corresponding accommodating hole 211. The elastomer may be held against the end edge of the sleeve b or in the hole at the inner end.

Further, an elastic body is fixed at a bottom of each accommodating hole 211. The elastic body is not limited to a special shape or material, provided that it can apply an elastic force to the sleeve b in the corresponding accommodating hole 211. For example, the elastic body may be a spring, rubber, etc. The elastic body can be hold against an end edge or in a hole at an inner end of the sleeve b. Further, as shown in FIG. 6, the notch 212 is located at a first end of the retaining groove 213. A recess portion recessed toward the opening of the accommodating hole 211 is provided at a second end of the retaining groove 213. The recess portion can accommodate the locating bump b3. After inserted into the notch 212, the locating bump b3 is rotated counterclockwise by 90° C. to slide into the recess portion. In the embodiment, six notches 212 are lined up along an arrangement direction of the accommodating holes 211.

Further, as shown in FIG. 1, the auxiliary sleeve replacement box 20 is swingably mounted to the main machine 30. The auxiliary sleeve replacement box 20 has a circular swing track, an axis of which is parallel to the climbing direction of the main machine 30.

As shown in FIG. 1, a toothed ring guiding member 26 is provided on the main machine 30. A toothed ring 27 is rotatably provided within the toothed ring guiding member 26. Specifically, refer to FIG. 1 and FIG. 7, the toothed ring guiding member 26 includes a support ring 263 fixed to a top end of the main machine 30. A circular lower guiding groove 264 is formed in a top surface of the support ring 263. A bottom ring of the toothed ring 27 is slidably provided in the lower guiding groove 264. An arc member 265 is provided above the support ring 263, which is semicircular preferably. An upper guiding groove 266 is formed in a bottom surface of the arc member 265. A top ring of the toothed ring 27 is slidably provided in the upper guiding groove 266. The arc member 265 is fixed to the support ring 263. Further, left and right sides of an upper end of the main machine 30 each are rotatably provided with a guiding gear 271 which is located at an inner side of the toothed ring 27 and engaged with the toothed ring.

Figure 7:
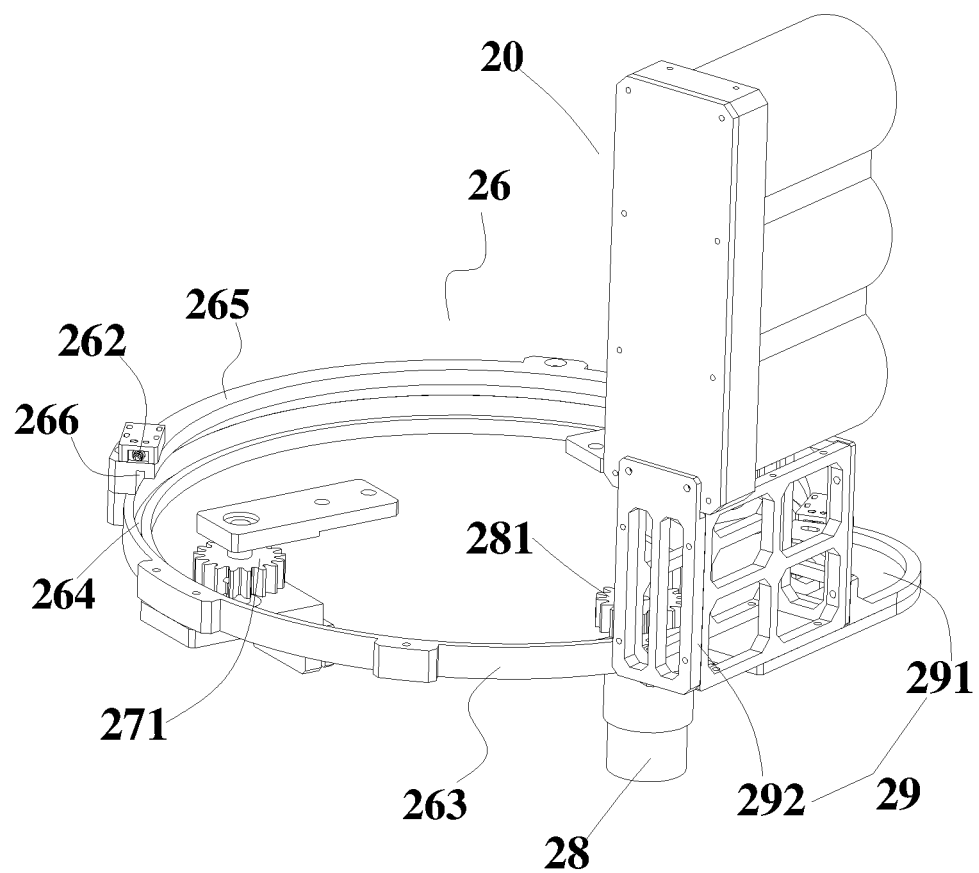
FIG. 7 is a schematic structural view of a toothed ring guiding member according to Embodiment 1 of the present disclosure.

Refer to FIG. 2 and FIG. 7, the auxiliary sleeve replacement box 20 is provided on the toothed ring 27. Specifically, a replacement box bracket 29 is fixed to the toothed ring 27. A bottom of the replacement box bracket 29 is of an L-shaped plate-like structure 291. A first end of the L-shaped plate-like structure 291 is vertically fixed to the toothed ring 27, and located at an outer side of the toothed ring 27. The L-shaped plate-like structure 291 is parallel to a plane in which the toothed ring 27 is located. A hollowed-out bracket 292 is provided on a second end of the L-shaped plate-like structure 291. The auxiliary sleeve replacement box 20 is fixed to a top of the hollowed-out bracket 292. Further, the sleeves b in the auxiliary sleeve replacement box 20 are parallel to a tangent line of the swing track of the auxiliary sleeve replacement box 20. In the embodiment, orientations of the detaching holes b2 of the sleeves b are opposite to a direction to which the second end of the L-shaped plate-like structure 291 points.

Refer to FIG. 1 and FIG. 7, a fifth motor 28 is provided on the toothed ring guiding member 26. A gear 281 engaged with the toothed ring 27 is provided on an output shaft of the fifth motor 28. Specifically, the fifth motor 28 is located under an inner side of the support ring 263. The gear 281 is located at the inner side the toothed ring 27.

Refer to FIG. 1 and FIG. 7, a first travel switch 261 and a second travel switch 262 are arranged on the toothed ring guiding member 26, which are located at a standby position and a replacement position, respectively. When the auxiliary sleeve replacement box 20 moves to the standby position, it is away from the bolt retightening device 10. When the auxiliary sleeve replacement box 20 moves to the replacement position, the bolt retightening device 10 can replace different sleeves b from the auxiliary sleeve replacement box 20.

Specifically, according to an orientation shown in FIG. 1, the first travel switch 261 is located on a left portion of the arc member 265, while the second travel switch 262 is located on a right portion of the arc member 265 in the embodiment. When the Y-axis displacement assembly 114 swings to the right side and is perpendicular to the climbing direction, a connecting line between two end portions of the arc member 265 is perpendicular to the moving direction of the Y-axis displacement assembly 114, such that when the auxiliary sleeve replacement box 20 moves to the replacement position, the striking anchor rod 12b of the bolt retightening device 10 can be coaxially aligned at a detaching hole b2 of a sleeve b in the auxiliary sleeve replacement box 20, as shown in FIG. 3. The striking anchor rod 12b can be connected to the detaching hole b2 by inserting into the detaching hole b2, and the connection can be achieved through a connecting structure in the prior art or a cooperated structure between the elastic pin 12c and the clamping groove as described above. By rotating the string anchor rod 12b to twist the sleeve b to a position at which the locating bump b3 is align with the notch 212, then the sleeve b can be drawn back and pulled out. A height of the bolt retightening device 10 is adjusted under the driving of the motor 116, such that the striking anchor rod 12b is aligned at sleeve b at different heights for replacement.

Further, the multifunctional climbing operation platform further includes a control unit. The control unit may be conventional in the prior art, such as a programmable logic controller (PLC). The photoelectric switches, the camera 12e, the first travel switch 261, and the second travel switch 262 are all connected to the control unit. The motor for sliding 35, the third motor 425, the motor for pushing and pulling 438b, a motor for adjusting pitching 47, the rotating motor 112b, the first motor 115a, the second motor 115b, the motor for striking 12d, and the fifth motor 28 are all controlled by the control unit.

Working Principle:

In actual applications, the multifunctional climbing operation platform provided by the present disclosure is mainly used for climbing objects such as a main angle steel part. The multifunctional climbing operation platform is clamped on the main angle steel part through the clamping devices 40 to climb up along the main angle steel part. The two claw bars 431 of each clamping device 40 get close to each other or away from each other to realize clamping or opening.

Avoidance for Foot Nails a1:

The claw bars 431 each include two segments. When the two claw bars 431 are opened, the inner angles between the rear bar bodies 431b and the front bar bodies 431c are greater than 180°, and the opening angle of the clamping device 40 is greater than that of the common clamping gripper in the prior art. When the opened clamping device 40 moves along the main angle steel part, obstacles such as long foot nails a1 can be avoided due to the large opening angle as shown in FIG. 4, and thus an avoidance range is wider than that of the prior art.

Avoidance for a Connecting Plate a2:

In response to clamping of the two claw bars 431, the movable part of the pressing member 42 can slide close to the clamping area between the end portions of the two claw bars 431, such that the movable part of the pressing member 42 abuts against an edge of the angle steel part to cooperate with the two claw bars 431 for the clamping. In response to opening of the two claw bars 431, the movable part of the pressing member 42 can move away from the clamping area between the end portions of the two claw bars 431, such that the movable part of the pressing member 42 is away from the edge of the angle steel part, and a certain safe distance can be kept between the movable part of the pressing member 42 and the edge of the angle steel part. When one clamping device moves along a length direction of the angle steel part, the movable part of the pressing member 42 can avoid a connecting plate protruded from the edge of the angle steel part. In actual applications, the V-shaped portion driving assembly can drive the V-shaped portion 421 to press against the edge of the angle steel part. As a result, the V-shaped portion 421 is closely attached to the edge of the angle steel part, and can be cooperated with the two claw bars 431 for firm clamping. In addition, the V-shaped portion driving assembly can further drive the V-shaped portion 421 to move away from the edge of the angle steel part to avoid the angle steel connecting plate. Therefore, the structure is simple, and the action is reliable.

In response to climbing to a position where a bolt is to be retightened, the bolt retightening device 10 screws the bolt on the object to be climbed for a retightening operation. Compared with the prior art, the present multifunctional climbing operation platform possesses a bolt retightening function, and achieves desirable safety, low labor intensity, and high retightening efficiency without manual operation. When it is necessary to fasten bolts of different specifications, the bolt retightening device 10 replaces different sleeves b from the auxiliary sleeve replacement box 20, and can retighten the bolts of different specifications in single climbing. Therefore, the application range is wide since it is unnecessary to return back to the ground for manual replacement, the operation is convenient, and the fastening efficiency is high.

In actual applications, when it is necessary to replace different sleeves b, the bolt retightening device 10 inserts a sleeve b to be replaced into an accommodating hole 211. The locating bumps b3 are inserted from the notches 212. The bolt retightening device 10 drives the sleeve b to be replaced to rotate and the locating bumps b3 are moved in place along the retaining grooves 213, such that the bolt retightening device 10 removes the sleeve b to be replaced, and the sleeve b to be replaced is placed into the accommodating hole 211. The sleeve b to be replaced is installed and located under cooperation between the retaining grooves 213 and the locating bumps b3. Thereafter, the bolt retightening device 10 moves to a new sleeve b to be installed, and screws the sleeve b to be installed. The locating bumps b3 slide to the notches 212 along the retaining grooves 213, and the sleeve b to be installed is drawn out and then used to screw and retighten. The multifunctional climbing operation platform can place and replace the sleeves b skillfully, with the simple structure and principle, and reliable action.

The two locating bumps b3 are cooperated with respective notches 212 and retaining grooves 213, which can stably limit a sleeve b and achieves a desirable locating effect. In actual applications, the elastic body can apply an elastic force to a sleeve b in an accommodating hole, and the locating bumps b3 can be firmly pressed against the retaining grooves 213, which effectively prevents independent rotation of the sleeve and achieves the desirable locating effect. Under the action of the elastic body, the locating bumps b3 are firmly pressed into the recess portions, which prevents the locating bumps b3 from sliding out of the retaining grooves 213 through the recess portions, and makes the location more reliable. In actual applications, the auxiliary sleeve replacement box 20 can be cooperated with the bolt retightening device 10 by adjusting a swing position of the auxiliary sleeve replacement box 20 on the main machine 30, so as to replace sleeves conveniently and flexibly. In actual applications, the fifth motor 28 drives the toothed ring 27 to rotate through the gear 281. Under the guidance of the toothed ring guiding member 26, the toothed ring 27 rotates. The auxiliary sleeve replacement box 20 rotates flexibly with the toothed ring 27. Therefore, the structure is simple and the action is reliable. In actual applications, the first travel switch 261 can detect a signal indicating the auxiliary sleeve replacement box 20 moves to the standby position. In this case, the auxiliary sleeve replacement box 20 is away from the bolt retightening device 10 so as to avoid interference with it. When the auxiliary sleeve replacement box 20 moves, the second travel switch 262 can detect a signal indicating the auxiliary sleeve replacement box 20 moves to the replacement position. In this case, the bolt retightening device 10 can replace a different sleeve b from the auxiliary sleeve replacement box 20, which realizes accurate replacement with a high precision. The sleeve b in the auxiliary sleeve replacement box 20 is arranged to be parallel to the tangent line of the circular swing track of the auxiliary sleeve replacement box 20, such that the sleeve b can move flexibly to align at the bolt retightening device 10, for ease of replacement of the sleeve b.

In actual applications, the rotation assembly 112 can drive the X-axis displacement assembly 113, the Y-axis displacement assembly 114, and the working head 12 as a whole to rotate along the rotation axis perpendicular to the object to be climbed, so as to adjust an operation position of the working head 12 on the object to be climbed. The X-axis displacement assembly 113 can drive the Y-axis displacement assembly 114 and the working head 12 as a whole to reciprocate, thereby adjusting the operation position of the working head 12 on the object to be climbed. The Y-axis displacement assembly 114 can drive the working head 12 to reciprocate along a direction perpendicular to the X-axis displacement assembly 113, such that the working head 12 gets close to or away from the object to be climbed, thereby meeting the retightening requirements. The structure as a whole has a simple principle, a flexible operation, and can meet requirements for adjusting the working head 12 to different operation positions. The included angle between the reciprocating direction of the movable end of the X-axis displacement assembly 113 and the rotation axis of the rotation assembly 112 is set as 45°, which can ensure that when the multifunctional climbing operation platform climbs an object such as the main angle steel part, the working head 12 is perpendicular to a side surface of the main angle steel part to retighten a bolt on a surface of the main angle steel part. When the rotation assembly 112 rotates, the working head 12 can be adjusted to point to different sides to meet requirements of retightening bolts at different sides of the main angle steel part.

The bottom frame 111 slides relative to the main machine 30 so that the working head 12 can be adjusted to different heights to retighten bolts at different positions, which ensures a wider operation range. In actual applications, the rotating motor 112b can drive the turntable 112c to rotate through the first worm gear and worm assembly, thereby driving components such as the X-axis displacement assembly 113 to rotate. Meanwhile, because of a self-locking action of the first worm gear and worm assembly, namely the power can only be transferred from the rotating motor 112b to the turntable 112c, the rotated components such as the X-axis displacement assembly 113 can be stably kept at a predetermined position, so as to ensure that the operation position is stationary fixedly. In actual applications, when the first motor 115a drives the X-axis screw rod 113c to rotate, the X-axis movable member 113b moves with it to adjust a position of the Y-axis displacement assembly 114. Therefore, the structure is simple, and the action is reliable. The second motor 115b drives the Y-axis screw rod 114c to rotate so as to move the Y-axis frame 114a in its entirety for position adjustment. Therefore, the structure is simple, and the action is reliable. In actual applications, when the motor for striking 12d operates, the striking anchor rod 12b can be driven to rotate, and the sleeve b is driven to rotate, thereby twisting and retightening the bolt and ensuring the retightening effect.

Two clamping devices 20 that can open and clamp alternatively are provided to achieve climbing along the main angle steel part, which yields simple structure and principle, and reliable actions. In actual applications, the clamping device driving assembly can drive the upper clamping device 40 to slide along the sliding rail 31 to realize a climbing action, which yields a smooth movement. By providing the clamping device driving assembly inside the frame of the main machine 30, the overall structure is regular. Meanwhile, the main machine 30 can protect the inside clamping device driving assembly from being affected by an outside object.

In actual applications, the push-pull plate 435 is configured to provide a power source for the clamping and opening of the clamping devices 40. In response to the clamping of one clamping device 40, the push-pull plate 435 moves to pull the rear bar bodies 431b, such that the hinge positions between the rear bar bodies 431b and the front bar bodies 431c can be pulled into the swing guide sleeves 432. Meanwhile, the two swing guide sleeves 432 swing, such that the two claw bars 431 get close to each other for the clamping. When the hinge positions between the rear bar bodies 431b and the front bar bodies 431c are pulled into the swing guide sleeves 432, the rear bar bodies 431b and the front bar bodies 431c are limited in the swing guide sleeves 432, and the inner angles between the rear bar bodies and the front bar bodies are smaller, and may be, for example, 180°. Consequently, the limited rear bar bodies 431b and front bar bodies 431c cannot swing to implement the stable clamping. When the push-pull plate 435 stops at different positions, positions of the two claw bars 431 in the respective swing guide sleeves 432 and an included angle between the two swing guide sleeves 432 are different. That is, a clamping angle between the two claw bars 431 can be adjusted flexibly by adjusting a stopping position of the push-pull plate 435. In response to the opening of one clamping device 40, the push-pull plate 435 pushes the rear bar bodies 431b, such that the hinge positions between the rear bar bodies 431b and the front bar bodies 431c can be pushed out of the respective swing guide sleeves 432, thereby implementing the opening of the two claw bars 431. When the hinge positions between the rear bar bodies 431b and the front bar bodies 431c are pushed out of the respective swing guide sleeves 432, the rear bar bodies and the front bar bodies swing. In this case, the inner angles between the rear bar bodies 431b and the front bar bodies 431c are greater than 180°. The obstacles such as long foot nails can be avoided due to the large opening angle, and thus the avoidance range is wider than that of the prior art.

With the guiding grooves 435a and the orientation grooves 434a, when the push-pull plate 435 moves, the plumbed push-pull shafts 431a can be guided to move along a preset track. As a result, during reciprocation of the push-pull plate 435, the two rear bar bodies 431b can be pulled at the same time to swing with the respective swing guide sleeves 432, and the hinge positions between the rear bar bodies 431b and the front bar bodies 431c can be pulled into the respective swing guide sleeves 432 to realize the clamping of the two claw bars 431. Moreover, the two rear bar bodies 431b can further be pushed at the same time to swing reversely with the respective swing guide sleeves 432, the hinge positions between the rear bar bodies 431b and the front bar bodies 431c can be pushed out of the respective swing guide sleeves 432, and the inner angles between the rear bar bodies 431b and the front bar bodies 431c are greater than 180°, thereby realizing the opening of the two claw bars 431. With the guiding grooves 435a and the orientation grooves 434a, the clamping and opening actions can be reliable. In actual applications, in response to rotation of the motor for pushing and pulling 438b, the second worm in the second worm gear and worm assembly can be driven to rotate, and thus the worm gear is driven to rotate. The worm gear drives the push-pull screw rod 438*a* to rotate, and the push-pull screw rod 438*a* drives the push-pull plate 435 to reciprocate. The second worm gear and worm assembly, as well as the screw rod and nut assembly, can realize a large transmission ratio, which can provide a large push-pull driving force for the push-pull plate 435 to implement stable clamping and opening. Moreover, the second worm gear and worm assembly and the screw rod and nut assembly possess a reverse locking function, namely power can only be transferred from the motor for pushing and pulling 438*b* to the push-pull plate 435, and cannot be transferred reversely, which can effectively ensure the stable clamping and opening, and prevent defects such as infirm clamping or unsmooth opening.

In actual applications, when the hinge positions between the rear bar bodies 431*b* and the front bar bodies 431*c* are pushed out of the swing guide sleeves 432, the gaps 431*f* on the front bar bodies 431*c* are exposed from the end portion of the swing guide sleeves 432. When the gaps 431*f* move to positions at which the limiting elastic pieces 436 are located, the limiting elastic pieces 436 are clamped into the gaps 431*f*. Under a force applied to the front bar bodies 431*c* by the limiting elastic pieces 436 when the limiting elastic pieces 436 are clamped into the gaps 431*f*, the front bar bodies 431*c* swing outward around the hinged positions relative to the rear bar bodies 431*b*, and can swing to positions at which the inner angles between the rear bar bodies 431*b* and the front bar bodies 431*c* are greater than 180°. Therefore, the avoidance range is expanded, the structure and principle are simple, and the action is sensitive and reliable. When the hinge positions between the rear bar bodies 431*b* and the front bar bodies 431*c* are retracted to the swing guide sleeves 432, the limiting elastic pieces 436 slide out of the gaps 431*f* to implement the clamping.

In actual applications, the bending ends 436*c* can be clamped into the gaps 431*f* to adjust the opening angle between the two claw bars, so that the structure is simple, and the action is reliable. The axial tension springs 437*c* can apply pulling forces to the end at which the connecting lugs 436*b* are provided, such that the bending ends 436*c* tend to press against the outer sides of the front bar bodies 431*c*, which ensures that the bending ends can slide in place accurately when the gaps 431*f* slide out and the bending ends 436*c* can slide flexibly out of the gaps 431*f* when the gaps 431*f* slide into the swing guide sleeves 432. Thus, the overall structure and principle are simple, and the action is reliable. The limiting elastic pieces 436 can be firmly attached to the swing guide sleeves 432 through the radial tension springs 437*b*, such that the limiting elastic pieces 436 can slide in place accurately when the gaps 431*f* slides out and the limiting elastic pieces 436 can slide flexibly out of the gaps 431*f* when the gaps 431*f* slide into the swing guide sleeves 432. Thus, the overall structure and principle are simple, and the action is reliable. In actual applications, when the hinge positions between the rear bar bodies 431*b* and the front bar bodies 431*c* are pushed out of the swing guide sleeves 432, the front bar bodies 431*c* swing outward around the hinge positions relative to the rear bar bodies 431*b* under the action of a pulling force applied by the reset tension springs 437*a* to the front bar bodies 431*c*, and can swing to positions at which the inner angles between the rear bar bodies 431*b* and the front bar bodies 431*c* are greater than 180°. Therefore, the avoidance range is expanded, the structure and principle are simple, and the action is sensitive and reliable. When the hinge positions between the rear bar bodies 431*b* and the front bar bodies 431*c* are retracted into the swing guide sleeves 432, the reset tension springs 437*a* are extended to implement the clamping. In actual applications, adjusting the opening angle between the claw bars 431 can implement clamping and climbing for different objects to be climbed, and thus the application range is wider.

Embodiment 2

The embodiment differs from Embodiment 1 in the following features.

Figure 33:
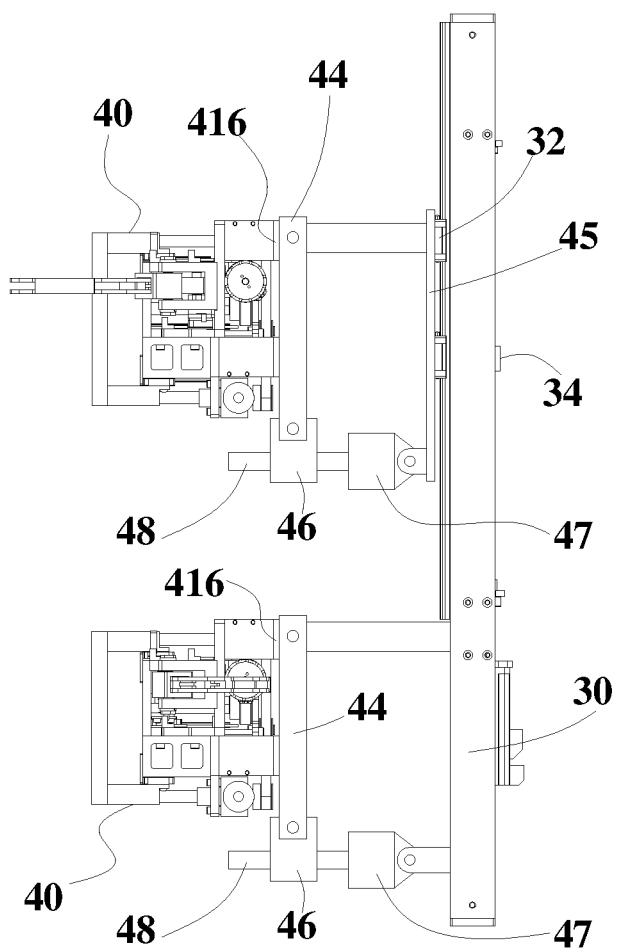
FIG. 33 is a right view of a multifunctional climbing operation platform according to Embodiment 2 of the present disclosure (with a bolt retightening device and an auxiliary sleeve replacement box not shown)

Pitching angles of the clamping devices 40 relative to the main machine 30 are adjustable. Specifically, as shown in FIG. 33, the upper clamping device 40 is provided at a front side of a vertical pitching adjustment plate 44 through four connecting plates 416. The four sliders 32 are provided at a rear side of a vertical sliding plate 45. The sliding sleeve 34 is provided at the rear side of the sliding plate 45 to drive the sliding plate 45 to slide up and down. An upper end or a lower end of the pitching adjustment plate 44 is hinged to the sliding plate 45, with a hinge shaft along a left-right direction. A pitching adjustment nut 46 is hinged to the other end of the pitching adjustment plate 44, with a hinge shaft along the left-right direction. An axis of the pitching adjustment nut 46 is perpendicular to its hinge shaft. A motor for adjusting pitching 47 is hinged to the sliding plate 45, with a hinge shaft along the left-right direction. An output shaft of the motor for adjusting pitching 47 is provided with a pitching adjustment screw rod 48 which is threadedly connected with the pitching adjustment nut 46. The motor for adjusting pitching 47 drives the pitching adjustment screw rod 48 to rotate in a forward or reverse direction, so as to drive the pitching adjustment plate 44 through the pitching adjustment nut 46 to change a pitching angle, and thereby driving the upper clamping device 40 to adjust the pitching angle.

As shown in FIG. 33, the lower clamping device 40 is provided at a front side of a vertical pitching adjustment plate 44 through four connecting plates 416. An upper end or a lower end of the pitching adjustment plate 44 is hinged to the main machine 30, with a hinge shaft along the left-right direction. A pitching adjustment nut 46 is hinged to the other end of the pitching adjustment plate 44, with a hinge shaft along the left-right direction. An axis of the pitching adjustment nut 46 is perpendicular to its hinge shaft. A motor for adjusting pitching 47 is hinged to a bottom of the main machine 30, with a hinge shaft along the left-right direction. An output shaft of the motor for adjusting pitching 47 is provided with a pitching adjustment screw rod 48 which is threadedly connected with the pitching adjustment nut 46. The motor for adjusting pitching 47 drives the pitching adjustment screw rod 48 to rotate in a forward or reverse direction, so as to drive the pitching adjustment plate 44 through the pitching adjustment nut 46 to change a pitching angle, and thereby the upper clamping device 40 to adjust the pitching angle.

Figure 34:
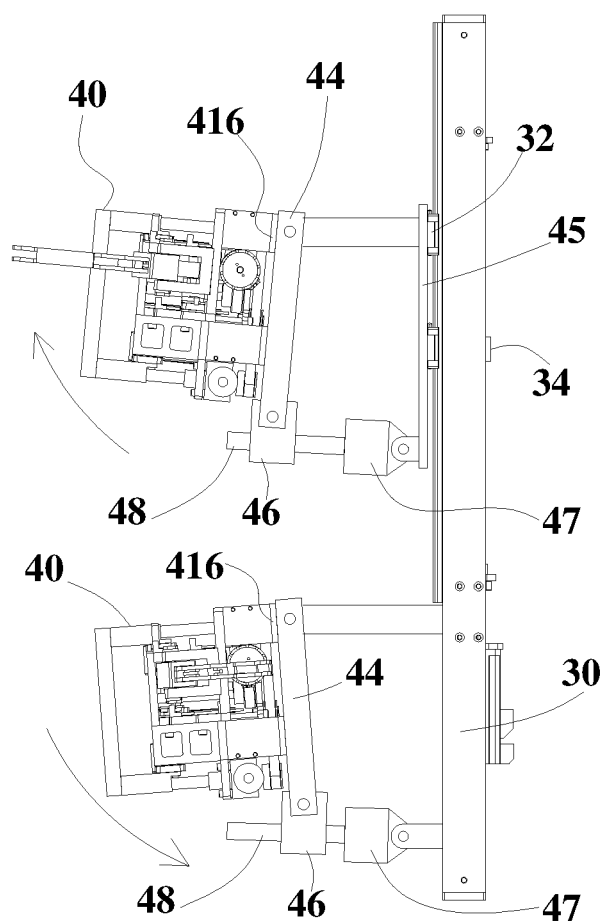
FIG. 34 is a schematic view of clamping devices with adjusted pitching angles according to Embodiment 2 of the present disclosure (with a bolt retightening device and an auxiliary sleeve replacement box not shown)

In actual climbing, adjusting the pitching angles of the clamping devices 40 relative to the main machine 30 can adjust a posture of the main machine 30. For example, the posture of the main machine 30 can be adjusted to be parallel to the object to be climbed, and the like, thereby meeting actual climbing requirements. FIG. 34 shows a state in which the upper clamping device 40 is pitched up, and the lower clamping device 40 is pitched down.

In addition, the embodiment also differs from Embodiment 1 in the auxiliary sleeve replacement box 20, and the specifical difference is shown as follows.

Figure 35:
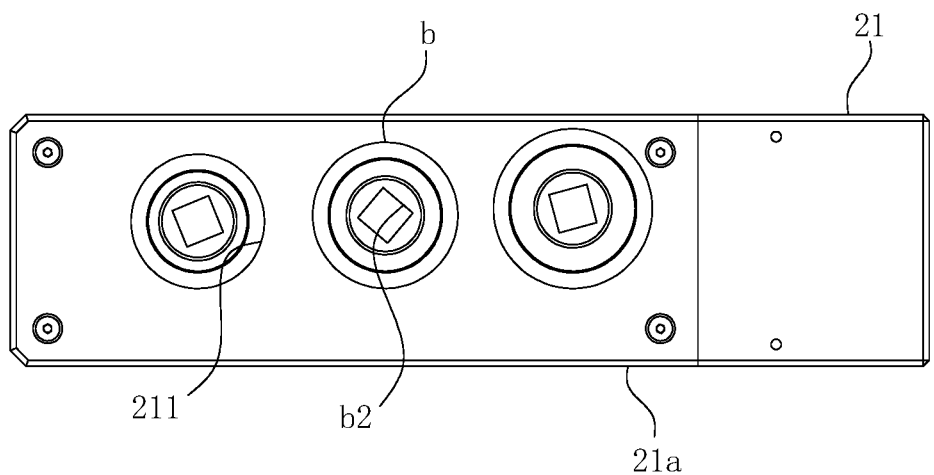
FIG. 35 is a view of an auxiliary sleeve replacement box according to Embodiment 2 of the present disclosure in an operating state.
Figure 36:
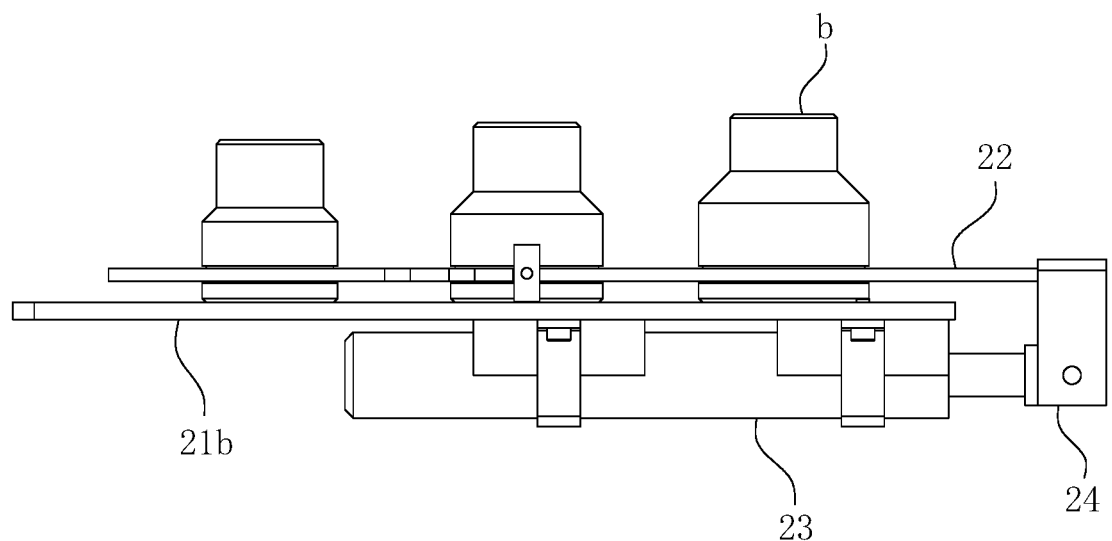
FIG. 36 is a front view of the structure in FIG. 35 with a housing removed.
Figure 38:
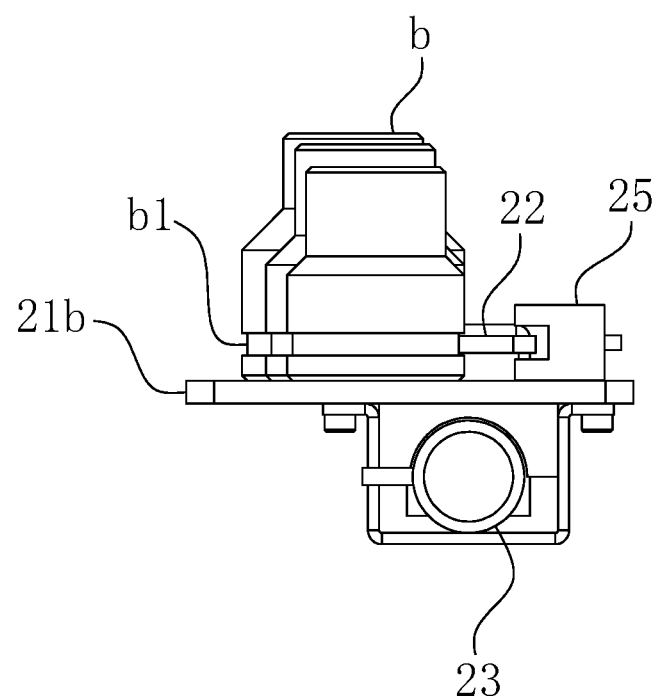
FIG. 38 is a left view of the structure in FIG. 36.

As shown in FIG. 38, an annular groove-shaped positioning notch b1 is formed in an outer side of one sleeve b. As shown in FIG. 35 and FIG. 36, the box body 21 includes a rectangular housing 21a and a mounting substrate 21b in the housing 21a. Accommodating holes 211 are formed in the housing 21a. The mounting substrate 21b serves as a bottom for each of the accommodating holes 211. In the embodiment, the three accommodating holes 211 are lined up along a length direction of the housing 21a.

Figure 37:
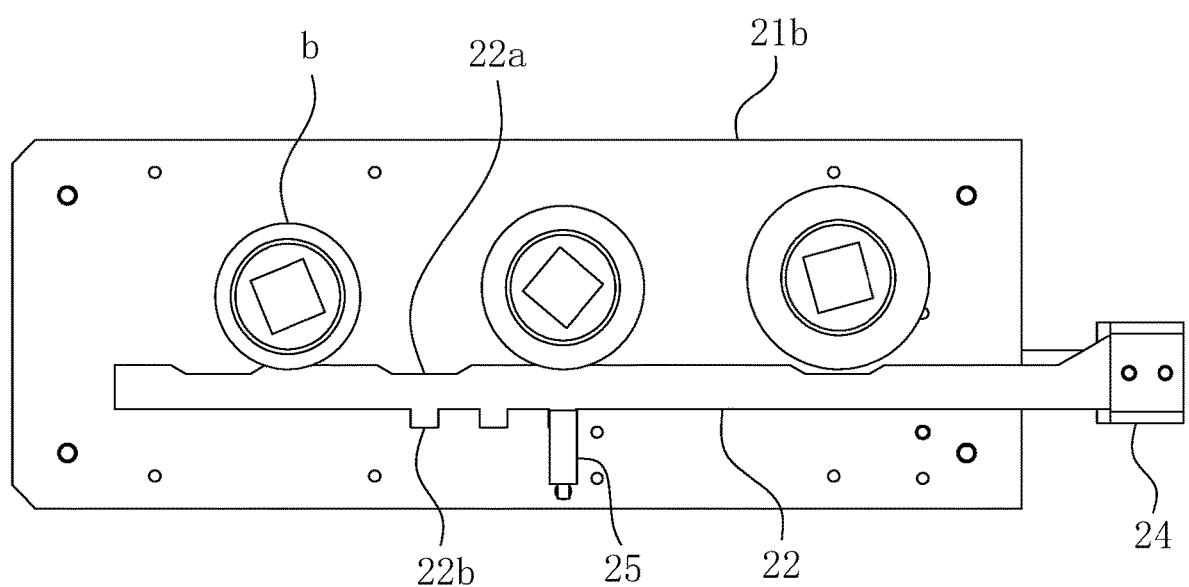
FIG. 37 is a top view of the structure in FIG. 36.

As shown in FIG. 36 and FIG. 37, an unlocking pull rod 22 is slidably mounted to the box body 21, which can move into or away from the positioning notch b1. Specifically, the unlocking pull rod 22 is slidably provided in the housing 21a, with a length direction thereof parallel to the length direction of the housing 21a. The unlocking pull rod 22 is of an elongated plate-like structure. There is a same distance between the positioning notch b1 of each of the three sleeves b and the unlocking pull rod 22.

Figure 39:
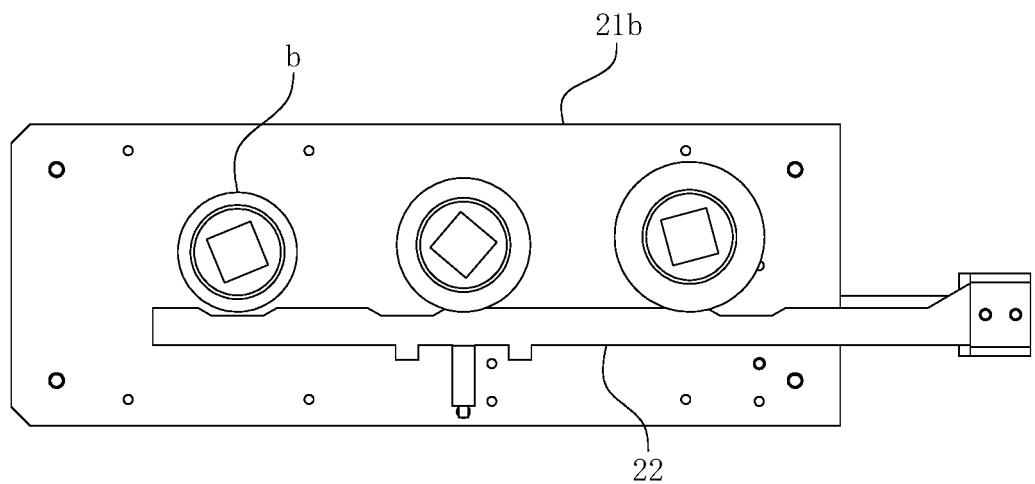
FIGS. 39-40 each are an operation flow diagram of an unlocking pull rod according to Embodiment 2 of the present disclosure.
Figure 40:
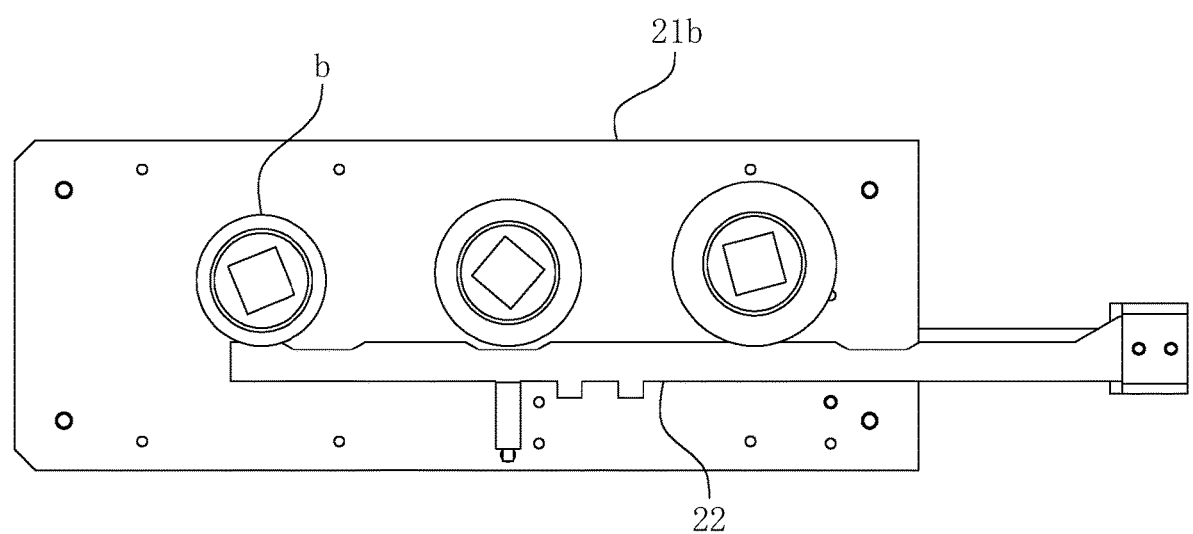
Figure 41:
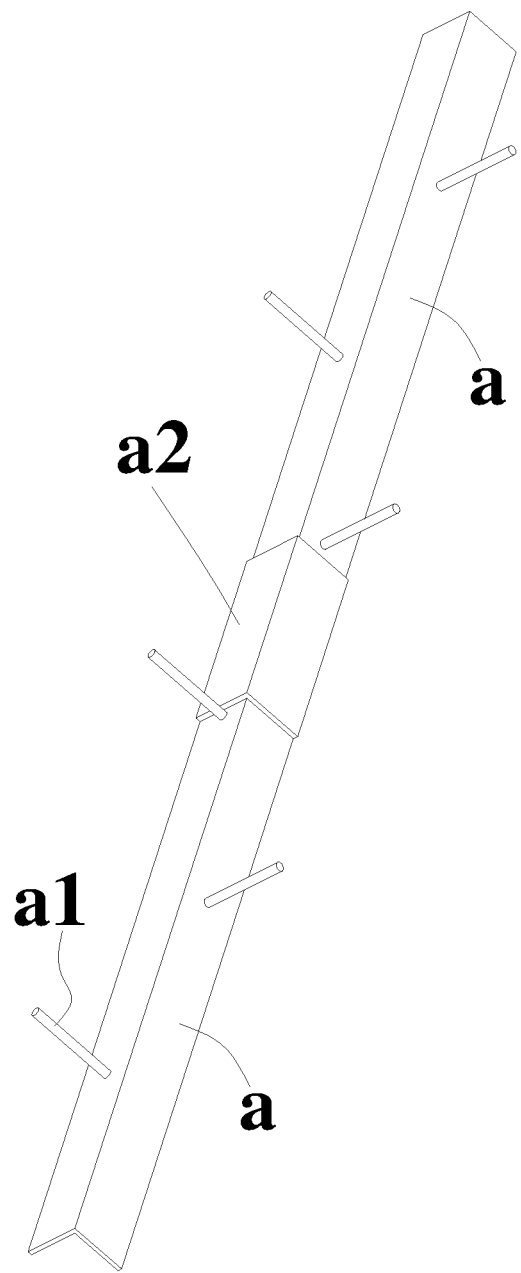
FIGS. 41-42 each are a schematic view of a main angle steel part in the prior art.
Figure 42:
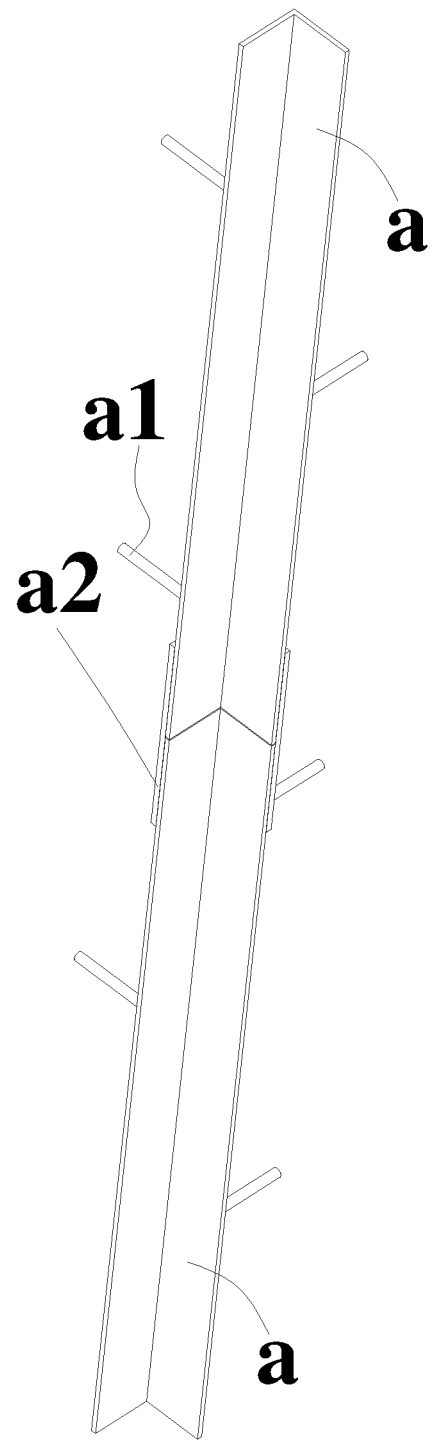

Further, as shown in FIG. 37, a side of the unlocking pull rod 22 closer to the sleeves b is provided with arc avoidance grooves 22a. When one arc avoidance groove 22a moves to a side of one corresponding sleeve b, the sleeve b can move axially along the corresponding accommodating hole 211. There are three arc avoidance grooves 22a in one-to-one correspondence with the three sleeves b. The arc avoidance grooves 22a are located such that one of the arc avoidance grooves 22a moves to a side edge of a corresponding sleeve b, positioning notches b1 of the other two sleeves b are retained by the unlocking pull rod 22. That is to say, the positioning notch b1 of only one of the sleeves b can be detached from the unlocking pull rod 22 at a same moment, as shown in FIG. 37, FIG. 39, and FIG. 40.

As shown in FIG. 37, are arranged on the unlocking pull rod 22 is provided with three induction points 22b which are in one-to-one correspondence with the arc avoidance grooves 22a. The box body 21 is provided with a photoelectric switch 25 cooperated with each of the induction points 22b. When an arc avoidance groove 22a moves to a side edge of a corresponding sleeve b, an induction point 22b corresponding to the arc avoidance groove 22a moves to the photoelectric switch 25.

Further, as shown in FIG. 36, the box body 21 is provided with a power source 23 which may be an electric push rod fixed to the mounting substrate 21b and parallel to the unlocking pull rod 22. A movable end of the power source 23 is connected to the unlocking pull rod 22 through a connecting member 24. The power source 23 can drive the unlocking pull rod 22 to move into or away from one positioning notch b1. The photoelectric switch 25 is connected to the control unit. The power source 23 is controlled by the control unit.

In the embodiment, the auxiliary sleeve replacement box 20 is mounted on the hollowed-out bracket 292 in the same manner as that in Embodiment 1. The three sleeves b of the auxiliary sleeve replacement box 20 are arranged sequentially from top to bottom.

The unlocking pull rod 22 can retain one sleeve b when moving into the corresponding positioning notch b1, so as to prevent an axial displacement of the sleeve, and thereby stably limiting the sleeve b. When the unlocking pull rod 22 is detached from the positioning notch b1, the sleeve b moves axially so as to be taken out. Therefore, the structure is simple, and the positioning is reliable. When the arc avoidance groove 22a moves to the side edge of the sleeve b, that is, the unlocking pull rod 22 is detached from the positioning notch b1, the sleeve b can move axially along the accommodating hole 211, so as to be taken out. Therefore, the unlocking pull rod 22 is used conveniently. When one arc avoidance groove 22a moves to the side edge of the corresponding sleeve b, the sleeve b can be drawn out. Positioning notches b1 of the other two sleeves b are retained by the unlocking pull rod 22 and do not move axially, which ensures that the positioning is reliable, and the other two sleeves b do not slide out. The photoelectric switch 25 can accurately sense a signal of an induction point 22b indicating that the corresponding arc avoidance groove 22a moves to the side edge of the corresponding sleeve b, so as to accurately take out the corresponding sleeve b to yield high precision.

Embodiment 3

The present disclosure further provides an operation method using the above multifunctional climbing operation platform, which includes the following steps.

S1: A slidable clamping device 40 clamps the object to be climbed, such as the main angle steel part a of the angle steel tower. When the clamping device 40 clamps the object to be climbed, the movable part of the pressing member 42 of the clamping device 40 moves to the object to be climbed and is pressed on the object, that is, the V-shaped portion 421 abuts against the edge of the main angle steel part a so as to cooperate with the two claw bars 431 of the clamping device 40 for firm clamping, as shown in FIG. 8 and FIG. 9.

As shown in FIG. 8, two claw bars 431 of a fixed clamping device 40 are opened. The push-pull plate 435 pushes the rear bar body 431b, such that the hinge positions between the rear bar bodies 431b and the front bar bodies 431c are pushed out of the respective swing guide sleeves 432 to realize the opening of the two claw bars 431. When the hinge positions between the rear bar bodies 431b and the front bar bodies 431c are pushed out of the respective swing guide sleeves 432, the rear bar bodies and the front bar bodies swing relative to each other. In this case, the gaps 431f on the front bar bodies 431c are exposed from the end portions of the swing guide sleeves 432. When the gaps 431f move to the limiting elastic pieces 436, the limiting elastic pieces 436 are clamped into the gaps 431f. Under a force applied to the front bar bodies 431c by the limiting elastic pieces 436 when the limiting elastic pieces 436 are clamped into the gaps 431f, the front bar bodies 431c swing outward around the hinge positions relative to the rear bar bodies 431b. Meanwhile, under the action of pulling force applied by the reset tension springs 437a to the front bar bodies 431c, the front bar bodies 431c swing outward around the hinge position relative to the rear bar bodies 431b. Consequently, the inner angles between the rear bar bodies 431b and the front bar bodies 431c are greater than 180°.

When the two claw bars 431 of one clamping device 40 are opened, the movable part of the pressing member 42 of the clamping device 40 moves away from the object to be climbed, that is, the V-shaped portion 421 moves backward and away from the edge of the main angle steel part a.

S2: The main machine 30 moves upward relative to the slidable clamping device 40 along the object to be climbed. Specifically, the motor for sliding 35 drives the sliding screw rod 33 to rotate. The sliding screw rod 33 is cooperated with the nut in the sliding sleeve 34, and the main machine 30 is driven to move upward relative to the upper clamping device 40. Meanwhile, the clamping device 40 fixed to the lower end of the main machine 30 moves upward herewith. Since two claw bars 431 of the fixed clamping device 40 are opened, and the inner angles between the rear bar bodies 431b and the front bar bodies 431c are greater than 180°, the foot nails at two sides of the edge of the main angle steel part a can be avoided during the upward movement. In addition, since the V-shaped portion 421 of the fixed clamping device 40 moves backward and away from the edge of the main angle steel part a, the connecting plate at a junction between two main angle steel parts a can be avoided during the upward movement.

Alternatively, before one clamping device 40 clamps the object to be climbed, a pitching angle of the clamping device relative to the main machine 30 is adjusted through the other clamping device 40, such that the main machine 30 is parallel to the object to be climbed.

S3: After the main machine 30 stops moving upward, a pitching angle of the main machine 30 is adjusted by means of components such as the pitching adjustment plate 44, the pitching adjustment nut 46, the motor for adjusting pitching 47, and the pitching adjustment screw rod 48 of the upper clamping device 40, such that the main machine 30 is parallel to the object to be climbed, the lower fixed clamping device 40 clamps the object to be climbed, the two claw bars 431 of the upper slidable clamping device 40 are opened, and inner angles between the rear bar bodies 431b and the front bar bodies 431c of the opened claw bars 431 are greater than 180°; and when the two claw bars 431 of the upper slidable clamping device 40 are opened, the movable part of the pressing member 42 of the upper clamping device 40 moves away from the object to be climbed, that is, the V-shaped portion 421 moves backward and away from the edge of the main angle steel part a.

S4: The upper slidable clamping device 40 moves upward along the main machine 30. Specifically, the motor for sliding 35 drives the sliding screw rod 33 to rotate. The sliding screw rod 33 is cooperated with the nut in the sliding sleeve 34, and the upper clamping device 40 is driven to move upward relative to the main machine 30. Since the two claw bars 431 of the upper clamping device 40 are opened, and the inner angles between the rear bar bodies 431b and the front bar bodies 431c are greater than 180°, the foot nails at two sides of the edge of the main angle steel part a can be avoided during the upward movement. In addition, since the V-shaped portion 421 of the upper clamping device 40 moves backward and away from the edge of the main angle steel part a, the connecting plate at a junction between two main angle steel parts a can be avoided during the upward movement.

Alternatively, before one clamping devices 40 clamps the object to be climbed, a pitching angle of the clamping device relative to the main machine 30 is adjusted through the other clamping device 40, such that the main machine 30 is parallel to the object to be climbed.

S5: Steps S1-S5 are repeated after the slidable clamping device 40 stops moving upward.

During the upward movement, when the main machine 30 drives the bolt retightening device 10 to climb to a position at which a bolt is to be retightened, the two clamping devices 40 both clamp the object to be climbed, and the bolt retightening device 10 screws the bolt on the object to be climbed. Specifically, a height of the bolt retightening device 10 is adjusted under the driving of the motor 116, such that the working head 12 is located at an operation height. Under the driving of the rotating motor 112b, the X-axis displacement assembly 113, the Y-axis displacement assembly 114 and the working head 12 are adjusted to a left side or a right side of the main angle steel part a, so as to retighten bolts at different sides. The X-axis displacement assembly 113 drives the working head 12 to move to a position directly facing a bolt. The Y-axis displacement assembly 114 drives the sleeve b of the working head 12 to sleeve on the bolt to be retightened. Thereafter, the motor for striking 12d rotates, the striking lugs 12g are continuously impacted through the striking head 12h, and the sleeve b is impacted to fasten the bolt, thereby retightening the bolt. Upon completion of the retightening, the Y-axis displacement assembly 114 drives the sleeve b of the working head 12 to move away from the bolt, and then other bolts are retightened.

In this process, when a sleeve b is to be replaced, the bolt retightening device 10 places the sleeve b into the auxiliary sleeve replacement box 20, and replaces it with a new sleeve b. Specifically, when it is necessary to replace the sleeve b, the X-axis displacement assembly 113, the Y-axis displacement sleeve 114 and the working head 12 are adjusted to the left side of the main angle steel part a under the driving of the rotation assembly 112, so as not to affect subsequent movement of the auxiliary sleeve replacement box 20. The fifth motor 28 drives the toothed ring 27 to rotate, such that the auxiliary sleeve replacement box 20 is driven to rotate to the second travel switch 262 at the replacement position. Thereafter, under the driving of the rotation assembly 112, the X-axis displacement assembly 113, the Y-axis displacement assembly 114 and the working head 12 are adjusted to the right side of the main angle steel part a. In this case, the striking anchor rod 12b of the working head 12 is directly aligned at a sleeve b in the auxiliary sleeve replacement box 20. Under the driving of the Y-axis displacement assembly 114, the working head 12 drives the striking anchor rod 12b to insert into the detaching hole b2 of the sleeve b and connect with it. Then, the sleeve b is taken out. The X-axis displacement assembly 113, the Y-axis displacement assembly 114 and the working head 12 are adjusted to the left side of the main angle steel part a under the driving of the rotation assembly 112 to retighten the bolt, and the auxiliary sleeve replacement box 20 is returned to the standby position. Upon completion of the bolt retightening, the above process is repeated. The sleeve b is inserted into a hollow accommodating hole 211 of the auxiliary sleeve replacement box 20 by the striking anchor rod 12b. After the sleeve b is limited, the striking anchor rod 12b is pulled out. By adjusting an overall height of the bolt retightening device 10, the striking anchor rod 12b is adjusted to align at another sleeve b and takes it out.

In actual applications of the operation method in the present disclosure, the two clamping devices 40 can open and clamp alternately to achieve smooth climbing. In response to climbing to a position at which a bolt is to be retightened, the two clamping devices 40 both clamp the object to be climbed, so as to provide a stable support for the retightening operation. The bolt retightening device 10 screws the bolt on the object to be climbed. Therefore, the climbing has a simple and reliable manner, the stable support can be provided for the retightening operation, the retightening effect is desirable, and the operation efficiency is high. In climbing, the inner angles between the rear bar bodies 431b and the front bar bodies 431c can be greater than 180°, and the opening angles of the claw bars of the clamping devices 40 are greater than that of the common clamping claws in the prior art. When the opened clamping device 40 moves along the main angle steel part, obstacles such as long foot nails can be avoided due to the large opening angles, and an avoidance range is wider than that of the prior art. When it is necessary to replace a sleeve b, the bolt retightening device 10 places the sleeve b into the auxiliary sleeve replacement box 20, and replaces it with a new sleeve b. Compared with the prior art, the operation method can change sleeves b of different specifications, and retighten bolts of different specifications in single climbing. Therefore, the application range is wide, it is unnecessary to return to the ground for manual replacement, the operation is convenient, and the fastening efficiency is high.

The foregoing embodiments are only used to explain the technical solutions of the present disclosure, and are not intended to limit the same. Although the present disclosure is described in detail with reference to the foregoing embodiments, those of ordinary skill in the art should understand that they can still modify the technical solutions described in the foregoing embodiments, or make equivalent substitutions on some technical features therein. These modifications or substitutions do not make the essence of the corresponding technical solutions deviate from the spirit and scope of the technical solutions of the embodiments of the present disclosure.

The invention claimed is:

1. A multifunctional climbing operation platform, comprising a main machine (30), wherein the main machine (30) is provided with a clamping device (40), a bolt retightening device (10), and an auxiliary sleeve replacement box (20), the clamping device (40) comprises: a fixed seat (41), and a pair of claw bars (431) arranged on the fixed seat (41) and each comprising a rear bar body (431b) and a front bar body (431c) hinged together, when the two claw bars (431) are opened, an inner angle between the rear bar body (431b) and the front bar body (431c) is greater than 180°, the main machine (30) and the clamping device (40) climb along an object to be climbed, the bolt retightening device (10) replaces different sleeves (b) from the auxiliary sleeve replacement box (20), and the bolt retightening device (10) screws a bolt on the object to be climbed.

2. The multifunctional climbing operation platform according to claim 1, wherein at least two clamping devices (40) are provided, and at least one of the clamping devices (40) slides back and forth relative to the main machine (30).

3. The multifunctional climbing operation platform according to claim 2, wherein two clamping devices (40) are provided, and one clamping device (40) slides back and forth relative to the main machine (30), and the other clamping device (40) is fixed to the main machine (30).

4. The multifunctional climbing operation platform according to claim 2, wherein the clamping device (40) which slides back and forth relative to the main machine (30) is provided with a slider (32), the main machine (30) is provided with a sliding rail (31) on which the slider (32) is slidably mounted, and the main machine (30) is further provided with a clamping device driving assembly.

5. The multifunctional climbing operation platform according to claim 4, wherein the clamping device driving assembly comprises a sliding screw rod (33) and a motor for sliding (35) arranged on the main machine (30), the clamping device (40) which slides back and forth relative to the main machine (30) is provided with a sliding sleeve (34) which is threadedly connected with the sliding screw rod (33), and the sliding screw rod (33) is connected to an output shaft of the motor for sliding (35).

6. The multifunctional climbing operation platform according to claim 4, wherein the main machine (30) is of a rectangular frame structure, and the clamping device driving assembly is located inside a frame of the main machine (30).

7. The multifunctional climbing operation platform according to claim 1, wherein the clamping device (40) further comprises a pressing member (42) whose movable part is located between root portions of the pair of claw bars (431), and the movable part of the pressing member (42) slides away from or close to a clamping area between head portions of the pair of claw bars (431).

8. The multifunctional climbing operation platform according to claim 7, wherein the movable part of the pressing member (42) comprises a V-shaped portion (421) slidably mounted to the fixed seat (41), and the pressing member (42) comprises a V-shaped portion driving assembly arranged on the fixed seat (41).

9. The multifunctional climbing operation platform according to claim 1, wherein a pair of swing guide sleeves (432) are hinged to the fixed seat (41), the rear bar body (431b) is slidably mounted in the corresponding swing guide sleeve (432), a push-pull plate (435) is slidably provided on the fixed seat (41), which pulls the rear bar body (431b) such that a hinge position between the rear bar body (431b) and the front bar body (431c) is pulled into the corresponding swing guide sleeve (432) to implement clamping of the pair of claw bars (431), and pushes the rear bar body (431b) such that the hinge position between the rear bar body (431b) and the front bar body (431c) is pushed out of the corresponding swing guide sleeve (432) to implement opening of the pair of claw bars (431).

10. The multifunctional climbing operation platform according to claim 9, wherein the push-pull plate (435) is provided with a pair of guiding grooves (435a), the fixed seat (41) is provided with a mounting plate (434) which is provided with a pair of orientation grooves (434a), an end portion of the rear bar body (431b) is provided with a plumbed push-pull shaft (431a), and two ends of the plumbed push-pull shaft (431a) are slidably mounted in the respective guiding groove (435a) and the respective orientation groove (434a), respectively.

11. The multifunctional climbing operation platform according to claim 9, wherein the fixed seat (41) is provided with a push-pull driving assembly which drives the push-pull plate (435) to move back and forth, the push-pull driving assembly comprises a push-pull screw rod (438a) rotatably which is mounted to the fixed seat (41) and rotatably mounted in the push-pull plate (435) by means of threaded connection, the push-pull driving assembly further comprises a motor for pushing and pulling (438b) arranged on the fixed seat (41), and the push-pull motor (438b) is connected to the push-pull screw rod (438a) through a second worm gear and worm assembly comprising a second worm gear (438c) and a second worm (438d).

12. The multifunctional climbing operation platform according to claim 9, wherein the swing guide sleeves (432) each are provided with a limiting elastic piece (436), the front bar body (431c) is provided with a gap (431f) fitted with the limiting elastic piece (436), and when the hinge position between the rear bar body (431b) and the front bar body (431c) is pushed out of the corresponding swing guide sleeve (432), the limiting elastic piece (436) is clamped into the gap (431f) so that the inner angle between the rear bar body (431b) and the front bar body (431c) is greater than 180°.

13. The multifunctional climbing operation platform according to claim 12, wherein the limiting elastic piece (436) is located on an outer side of the corresponding swing guide sleeve (432), a first end of the limiting elastic piece (436) is an inward bending end (436c) which is pressed on an outer side of the front bar body (431c), and the gap (431f) is located on an outer side of an end of the front bar body (431c) hinged with the rear bar body (431b).

14. The multifunctional climbing operation platform according to claim 13, wherein the swing guide sleeves (432) each are provided with a fixed post (432b) on an outer side, the limiting elastic piece (436) is provided with an elongated hole (436*d*) whose length direction is parallel to a guiding direction of the corresponding swing guide sleeve (432), the fixed post (432*b*) is located in the elongated hole (436*d*), a second end of the limiting elastic piece (436) is an outward bending connecting lug (436*b*), and an axial tension spring (437*c*) is connected between the connecting lug (436*b*) and the fixed post (432*b*).

15. The multifunctional climbing operation platform according to claim 12, wherein radial tension springs (437*b*) are provided between the limiting elastic piece (436) and the respective swing guide sleeve (432), and the radial tension springs (437*b*) enable the limiting elastic piece (436) to be pressed against the respective swing guide sleeve (432).

16. The multifunctional climbing operation platform according to claim 1, wherein a reset tension spring (437*a*) is provided between the rear bar body (431*b*) and the front bar body (431*c*), which enables the front bar body (431*c*) swing outward around an end portion of the rear bar body (431*b*).

17. The multifunctional climbing operation platform according to claim 1, wherein an opening angle between the pair of claw bars (431) is adjustable.

18. The multifunctional climbing operation platform according to claim 1, wherein a pitching angle of the clamping device (40) relative to the main machine (30) is adjustable.

19. An operation method using the multifunctional climbing operation platform according to claim 1, wherein two clamping devices (40) are provided, one clamping device (40) slides back and forth relative to the main machine (30), and the other clamping device (40) is fixed to the main machine (30), and the operation method comprises the following steps:
- S1: allowing the slidable clamping device (40) to clamp an object to be climbed, wherein two claw bars (431) of the fixed clamping device (40) are opened, and an inner angle between a rear bar body (431*b*) and a front bar body (431*c*) of each of the opened claw bars (431) is greater than 180°;
- S2: allowing the main machine (30) to move upward relative to the slidable clamping device (40) along the object to be climbed;
- S3: allowing, after the main machine (30) stops to move upward, the fixed clamping device (40) to clamp the object to be climbed, wherein two claw bars (431) of the slidable clamping device (40) are opened, and an inner angle between a rear bar body (431*b*) and a front bar body (431*c*) of each of the opened claw bars (431) is greater than 180°;
- S4: allowing the slidable clamping device (40) to move upward along the main machine (30); and
- S5: repeating steps S1-S5 after the slidable clamping device (40) stops to move upward; and
- when the main machine (30) drives a bolt retightening device (10) to climb to a position where a bolt is to be retightened, the two clamping devices (40) clamp the object to be climbed, and the bolt retightening device (10) screws the bolt on the object to be climbed, and when a sleeve (b) is to be replaced, the bolt retightening device (10) places the sleeve (b) to be replaced into an auxiliary sleeve replacement box (20) and replaces it with a new sleeve (b) of the auxiliary sleeve replacement box (20).

20. The operation method according to claim 19, wherein the clamping devices (40) each further comprises a pressing member (42) whose movable part is located between the root portions of the two claw bars (431), and the movable part of the pressing member (42) slides away from or close to a clamping area between the end portions of the two claw bars (431);
- when a clamping device (40) clamps the object to be climbed, the movable part of the pressing member (42) of the clamping device (40) moves toward the object to be climbed and is pressed against the object to be climbed; and
- when two claw bars (431) of a clamping device (40) are opened, the movable part of the pressing member (42) of the clamping device (40) moves away from the object to be climbed.

21. The operation method according to claim 19, wherein pitching angles of the clamping devices (40) relative to the main machine (30) are adjustable, and before one clamping device (40) clamps the object to be climbed, a pitching angle of the clamping device relative to the main machine (30) is adjusted through the other clamping device (40), such that the main machine (30) is parallel to the object to be climbed.

\* \* \* \* \*